United States Patent
Murdison et al.

(10) Patent No.: US 11,663,696 B2
(45) Date of Patent: May 30, 2023

(54) DYNAMIC UNIFORMITY CORRECTION

(71) Applicant: Meta Platforms Technologies, LLC, Menlo Park, CA (US)

(72) Inventors: Thomas Scott Murdison, Kirkland, WA (US); Romain Bachy, Seattle, WA (US); Edward Buckley, Redmond, WA (US); Bo Zhang, Kenmore, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/846,420

(22) Filed: Jun. 22, 2022

(65) Prior Publication Data

US 2022/0366530 A1   Nov. 17, 2022

Related U.S. Application Data

(63) Continuation of application No. 16/919,025, filed on Jul. 1, 2020, now Pat. No. 11,410,272.

(51) Int. Cl.
| | | |
|---|---|---|
| *G06T 3/40* | (2006.01) | |
| *G06F 3/01* | (2006.01) | |
| *G02B 27/00* | (2006.01) | |
| *G06T 5/00* | (2006.01) | |

(52) U.S. Cl.
CPC ............ *G06T 3/4007* (2013.01); *G06F 3/013* (2013.01); *G06T 3/40* (2013.01); *G02B 27/0093* (2013.01); *G06T 5/00* (2013.01)

(58) Field of Classification Search
CPC . G06T 3/40; G06T 3/4007; G06T 5/00; G06F 3/013; G06F 3/017; G02B 27/0093
See application file for complete search history.

(56) References Cited

U.S. PATENT DOCUMENTS

| | | | |
|---|---|---|---|
| 10,958,702 B1* | 3/2021 | Yang | H04N 21/2387 |
| 2010/0225743 A1* | 9/2010 | Florencio | H04N 13/398 |
| | | | 348/46 |
| 2017/0161951 A1* | 6/2017 | Fix | G06V 40/19 |
| 2018/0004285 A1* | 1/2018 | Castleman | G11B 20/10527 |
| 2018/0314324 A1* | 11/2018 | Abed Aljawad | G06F 3/04842 |
| 2019/0250409 A1* | 8/2019 | Stafford | G02B 27/0093 |
| 2020/0387219 A1* | 12/2020 | Chappell | G06V 40/193 |
| 2021/0173474 A1* | 6/2021 | Sztuk | G06T 19/006 |
| 2021/0191319 A1* | 6/2021 | Christmas | G03H 1/2294 |

* cited by examiner

*Primary Examiner* — Jwalant Amin
(74) *Attorney, Agent, or Firm* — Baker Botts L.L.P.

(57) ABSTRACT

In one embodiment, a computing system may determine, a predicted eye position of a viewer corresponding to a future time moment for displaying a frame. The system may generate a first correction map for the frame based on the predicted eye position of the viewer. The system may retrieve one or more second correction maps used for correcting one or more proceeding frames. The system may generate a third correction map based on the first correction map generated based on the predicted eye position of the viewer and the one or more second correction maps used for correcting the one or more proceeding frames. The system may adjust pixel values of the frame based at least on the third correction map. The system may output the frame with the adjusted pixel values to a display.

20 Claims, 14 Drawing Sheets

DYNAMIC UNIFORMITY CORRECTION

PRIORITY

This application is a continuation under 35 U.S.C. § 120 of U.S. patent application Ser. No. 16/919,025, filed 1 Jul. 2020, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for compensating waveguide non-uniformity by dynamically correcting images to be displayed using correction maps determined based on the current eye position and correction maps of previous frames. For a particular eye position, the system may generate correction maps based on measured non-uniform light transmission characteristics of the waveguide as viewed from that particular eye position. For a static image viewed from that particular eye position, the system may eliminate the negative visual effect caused by the waveguide non-uniformity by applying correction maps generated for that eye position. For a series of dynamical images viewed from different eye positions, the system may use an eye tracking system to measure the eye position of the viewer dynamically and determine the appropriate correction maps based on the dynamically measured eye positions.

In particular embodiments, the system may correct the images to be displayed using correction maps that are generated based on the current eye position and one or more previous correction maps used for correcting preceding frames. The system may generate correction maps for a number of pre-determined eye positions (e.g., corresponding to a 6×6 mesh grid or a 9×7 mesh grid) with respect to the waveguide region (e.g., corresponding to an eye-box area having a size of 10 mm×10 mm). Each correction map may be associated with a particular color channel of RGB color channels and each pre-determined eye position may be associated with three correction maps for respective RGB color channels. Each correction map may include an array of scaling factors to scale the image pixel values of that particular color channel. The system may store the generated correction maps in a database and a computer storage. These correction maps may have a relatively low spatial resolution (e.g., 25 pixels×25 pixels) to minimize the burden on system resource usage (e.g., storage space, memory access, processing power, CPU resources, etc.). For correcting a current frame of a sequence of images, the system may first determine the current eye position (X, Y) of the viewer using the eye tracking system. If the current eye position (X, Y) falls on one of pre-determined eye positions (e.g., within a threshold distance), the system may select the correction maps associated with that eye position. The selected correction maps may be used for correcting the current frame after being processed by a temporal filter in a later step. If the current eye position (X, Y) does not fall on any pre-determined eye positions but instead falls within an area among the pre-determined eye positions, the system may identify sixteen pre-determined eye positions (e.g., a 4×4 array of positions) corresponding to an area (e.g., the smallest area corresponding to a 4×4 points of the mesh grid) that contains the current eye position (X, Y). Then, the system may apply bicubic interpolation on the sixteen groups of correction maps associated with the sixteen pre-determined eye positions to generate correction maps (for RGB color channels) for the current eye position. The system may use the bicubic interpolation to generate three correction maps for the three RGB color channels, respectively, with each correction map being generated based on bicubic interpolation of sixteen correction maps of the same color channel. Alternatively, the system may identify the closest four pre-determined eye positions (e.g., corresponding to a 2×2 array) that are located at the four corners of a mesh grid area containing the current eye position (X, Y). Then, the system may apply bilinear interpolation on the four groups of correction maps associated with the four pre-determined eye positions to generate correction maps (for RGB color channels) for the current eye position. The system may use the bilinear interpolation to generate three correction maps for the RGB color channels, respectively, with each correction map being generated based on bilinear interpolation of four correction maps of the same color channel.

Then, the system may retrieve, from a computer storage, previous correction maps that are used for correcting preceding frames. The system may use a temporal filter to generate, for each color channel, an optimized correction map (e.g., an average correction map, a weighted average correction map, or a map generated using a probabilistic estimation method) based on the correction map generated using bilinear or bicubic interpolation based on the current eye position and the retrieved correction maps used for correcting one or more preceding frames. Since the pre-determined correction maps have a relatively low spatial resolution (e.g., 25 pixels×25 pixels), the optimized correction maps generated based on the pre-determined correction maps may also have a relatively low spatial resolution (e.g., 25 pixels×25 pixels). The system may use bilinear interpolation or similar interpolation to up-sample the optimized correction maps to have a higher resolution that matches the image resolution or display resolution (e.g., 1856 pixels× 1472 pixels). Then, the system may apply the high-resolution correction maps generated by the up-sampling process to the current frame with each high-resolution correction map being applied to one color channel before outputting the current frame for display. Applying these high-resolution correction maps may cause the pixel values of RGB color channels of the current frame to be adjusted by the corresponding scaling factors of respective high-resolution correction maps. As a result, the displayed content may appear smoother over time and more resilient to errors of the eye-tracking data. The visual effects caused by the waveguide non-uniformity may be eliminated or reduced.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, a method may comprise, by a computing system:
  determining, for a current frame to be displayed and using an eye tracking system, a current eye position of a viewer;
  determining a first array of scaling factors based on the determined current eye position of the viewer;
  retrieving one or more second arrays of scaling factors used for correcting one or more proceeding frames of the current frame;
  determining a third array of scaling factors based on the first array of scaling factors determined based on the current eye position and the one or more second arrays of scaling factors used for correcting the one or more proceeding frames;
  adjusting pixel values of the current frame based at least on the third array of scaling factors; and
  outputting the current frame with the adjusted pixel values to a display.

The current eye position may be with respect to a pupil replicating waveguide of the display for transmitting image light to eyes of the viewer.

In an embodiment, a method may comprise, by a computing system:
  identifying sixteen pre-determined eye positions associated with an area of the waveguide containing the current eye position; and
  accessing, from a computer storage, sixteen groups of pre-determined arrays of scaling factors associated with the sixteen pre-determined eye positions, and wherein the first array of scaling factors is determined based on bicubic interpolation on the sixteen groups of pre-determined arrays of scaling factors.

The first array of scaling factors, the sixteen groups of pre-determined arrays of scaling factors, and the third array of scaling factors may be associated with a particular color channel, and the adjusted pixel values of the current frame may be associated with that particular color channel.

In an embodiment, a method may comprise, by a computing system:
  identifying four pre-determined eye positions associated with an area of the waveguide containing the current eye position; and
  accessing, from a computer storage, four groups of pre-determined arrays of scaling factors associated with the four pre-determined eye positions, and wherein the first array of scaling factors is determined based on bilinear interpolation on the four groups of pre-determined arrays of scaling factors.

The first array of scaling factors, the four groups of pre-determined arrays of scaling factors, and the third array of scaling factors may be associated with a particular color channel, and the adjusted pixel values of the current frame may be associated with that particular color channel.

The current eye position may be within a threshold distance to a pre-determined eye position associated with a pre-determined array of scaling factors, and the first array of scaling factors may be determined by selecting the pre-determined array of scaling factors associated with that pre-determined eye position.

Each scaling factor in the third array of scaling factors may be an average of corresponding scaling factors of the first array of scaling factors and the one or more second arrays of scaling factors, and the third array of scaling factors may be determined using a temporal filter.

The third array of scaling factors may have a plurality of first scaling factors corresponding to a spatial resolution lower than an image resolution of the current frame.

In an embodiment, a method may comprise, by a computing system:
  determining a plurality of second scaling factors based on bilinear interpolation on the plurality of first scaling factors; and
  determining a fourth array of scaling factors comprising the plurality of first scaling factors and the plurality of second scaling factors, wherein the fourth array of scaling factors corresponds to the image resolution of the current frame, and wherein adjusting pixel values of the current frame based on the third array of scaling factors comprises applying the fourth array of scaling factors to the current frame.

In an embodiment, a method may comprise, by a computing system:
  determining a predicted eye-position trajectory for the viewer corresponding to a pre-determined time window, the predicted eye-position trajectory may be determined based on eye tracking data.

In an embodiment, a method may comprise, by a computing system:
  determining a predicted eye position of the viewer for the current frame based on the current eye position and the predicted eye-position trajectory, wherein the predicted eye position corresponds to a future time when the current frame is displayed factoring in an amount of time needed for determining the third array of scaling factors and applying the third array of scaling factors to the current frame.

The first array of scaling factors may be determined based on the predicted eye position of the viewer.

In an embodiment, a method may comprise, by a computing system:

determining a predicted eye position of the viewer for each of one or more sequential frames of the current frame; and determining a fifth array of scaling factors for each of the one or more sequential frames of the current frame, wherein the third array of scaling factors is determined based on the fifth arrays of scaling factors for the one or more sequential frames of the current frame.

In an embodiment, one or more computer-readable non-transitory storage media may embody software that is operable when executed to perform a method according to the invention or any of the above mentioned embodiments or to:

determine, for a current frame to be displayed and using an eye tracking system, a current eye position of a viewer;

determine a first array of scaling factors based on the determined current eye position of the viewer;

retrieve one or more second arrays of scaling factors used for correcting one or more proceeding frames of the current frame;

determine a third array of scaling factors based on the first array of scaling factors determined based on the current eye position and the one or more second arrays of scaling factors used for correcting the one or more proceeding frames;

adjust pixel values of the current frame based at least on the third array of scaling factors; and output the current frame with the adjusted pixel values to a display.

The current eye position may be with respect to a pupil replicating waveguide of the display for transmitting image light to eyes of the viewer.

In an embodiment, one or more computer-readable non-transitory storage media may embody software that is operable when executed to perform a method according to the invention or any of the above mentioned embodiments or to:

identify sixteen pre-determined eye positions associated with an area of the waveguide containing the current eye position; and access, from a computer storage, sixteen groups of pre-determined arrays of scaling factors associated with the sixteen pre-determined eye positions, and wherein the first array of scaling factors is determined based on bicubic interpolation on the sixteen groups of pre-determined arrays of scaling factors.

In an embodiment, a system may comprise: one or more processors; one or more non-transitory computer-readable storage media embodying instructions; and one or more processors coupled to the storage media and operable to execute the instructions to perform a method according to the invention or any of the above mentioned embodiments or to:

determine, for a current frame to be displayed and using an eye tracking system, a current eye position of a viewer;

determine a first array of scaling factors based on the determined current eye position of the viewer;

retrieve one or more second arrays of scaling factors used for correcting one or more proceeding frames of the current frame;

determine a third array of scaling factors based on the first array of scaling factors determined based on the current eye position and the one or more second arrays of scaling factors used for correcting the one or more proceeding frames;

adjust pixel values of the current frame based at least on the third array of scaling factors; and output the current frame with the adjusted pixel values to a display.

The current eye position may be with respect to a pupil replicating waveguide of the display for transmitting image light to eyes of the viewer In an embodiment, a system may comprise: one or more processors; one or more non-transitory computer-readable storage media embodying instructions; and one or more processors coupled to the storage media and operable to execute the instructions to perform a method according to the invention or any of the above mentioned embodiments or to:

identify sixteen pre-determined eye positions associated with an area of the waveguide containing the current eye position; and access, from a computer storage, sixteen groups of pre-determined arrays of scaling factors associated with the sixteen pre-determined eye positions, and wherein the first array of scaling factors is determined based on bicubic interpolation on the sixteen groups of pre-determined arrays of scaling factors.

In an embodiment, one or more computer-readable non-transitory storage media may embody software that is operable when executed to perform a method according to or within any of the above mentioned embodiments.

In an embodiment, a system may comprise: one or more processors; and at least one memory coupled to the processors and comprising instructions executable by the processors, the processors operable when executing the instructions to perform a method according to or within any of the above mentioned embodiments.

In an embodiment, a computer program product, preferably comprising a computer-readable non-transitory storage media, may be operable when executed on a data processing system to perform a method according to or within any of the above mentioned embodiments.

DESCRIPTION OF EXAMPLE EMBODIMENTS

Figure 1A:
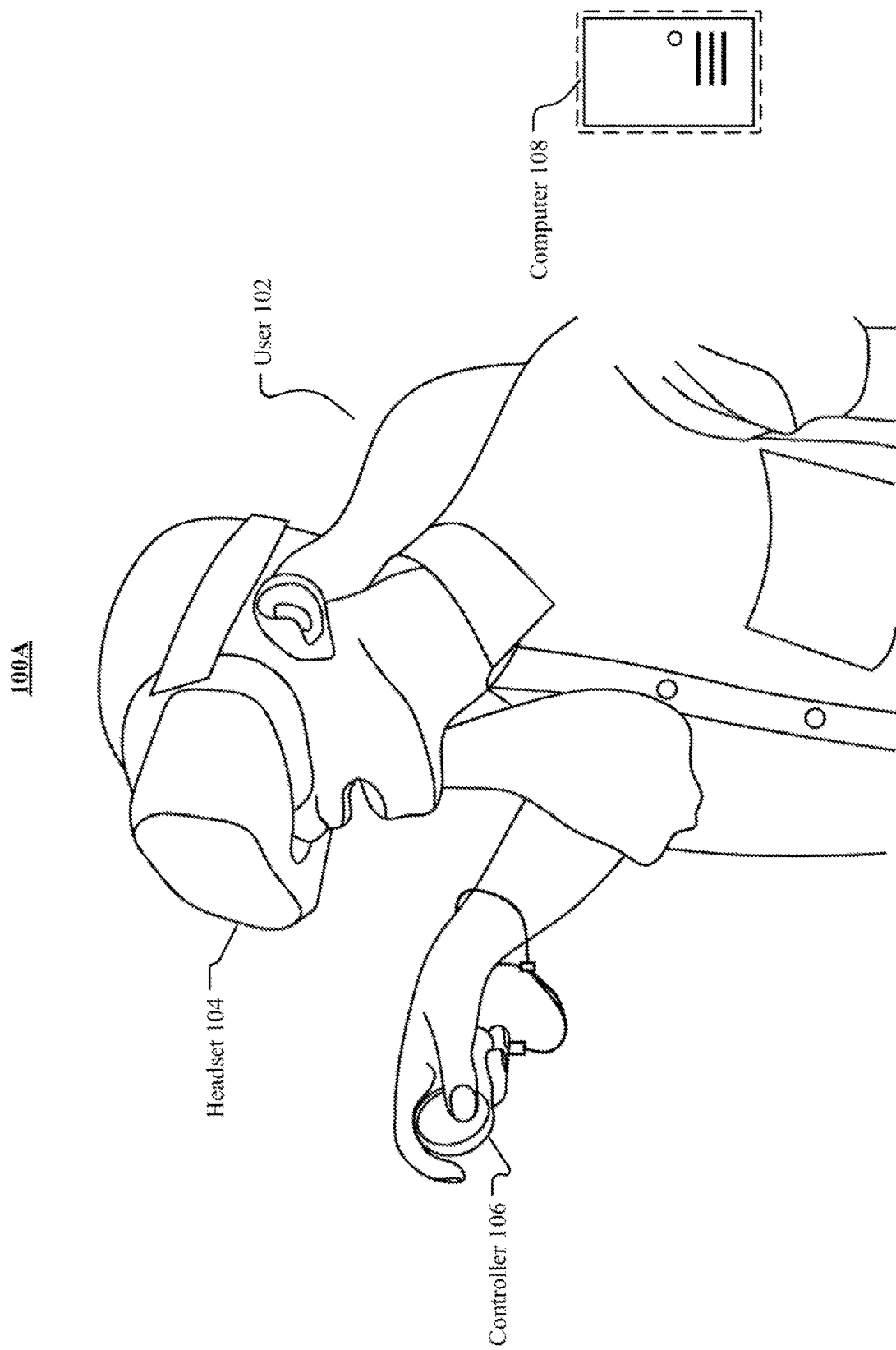
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
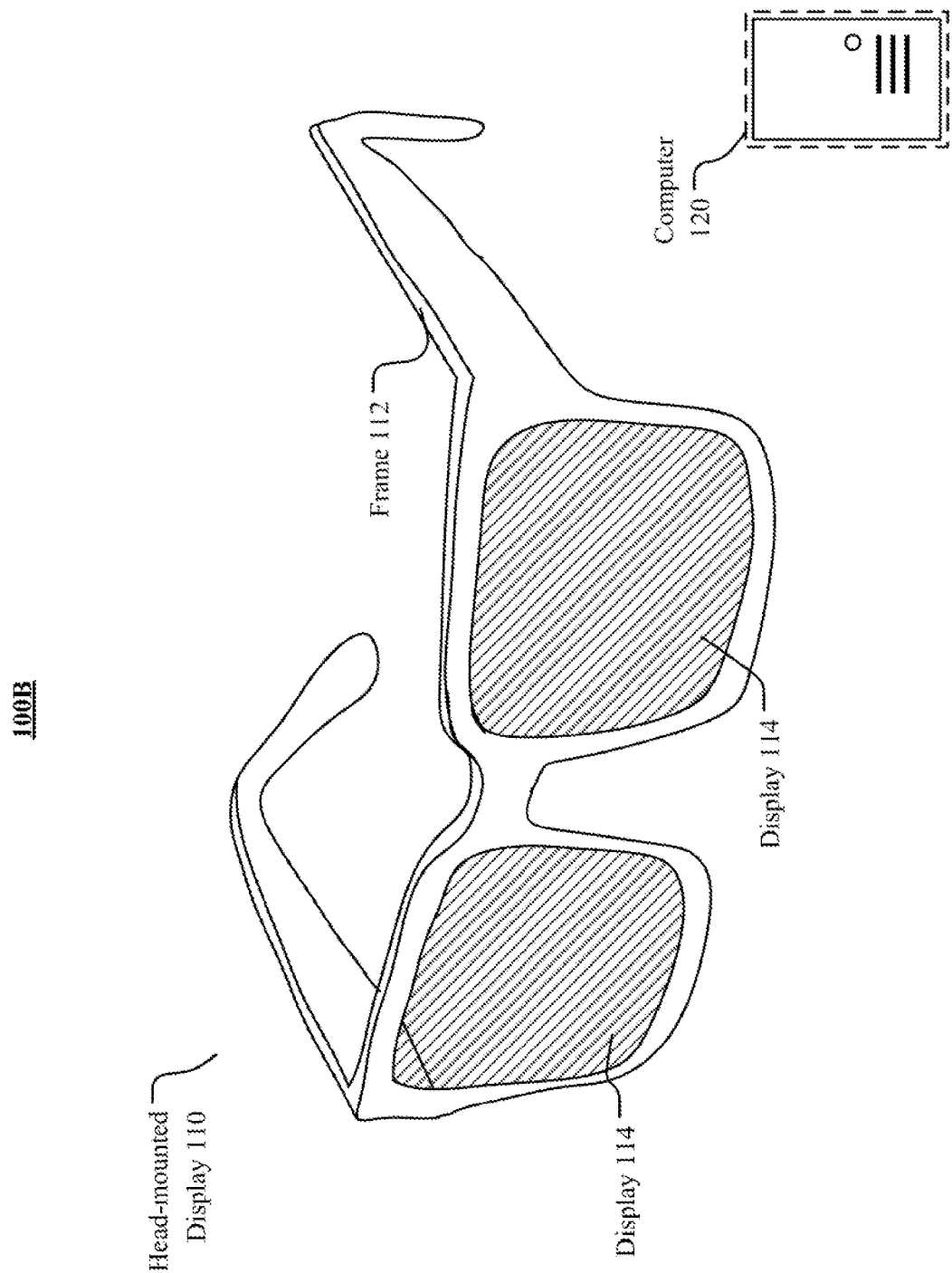
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
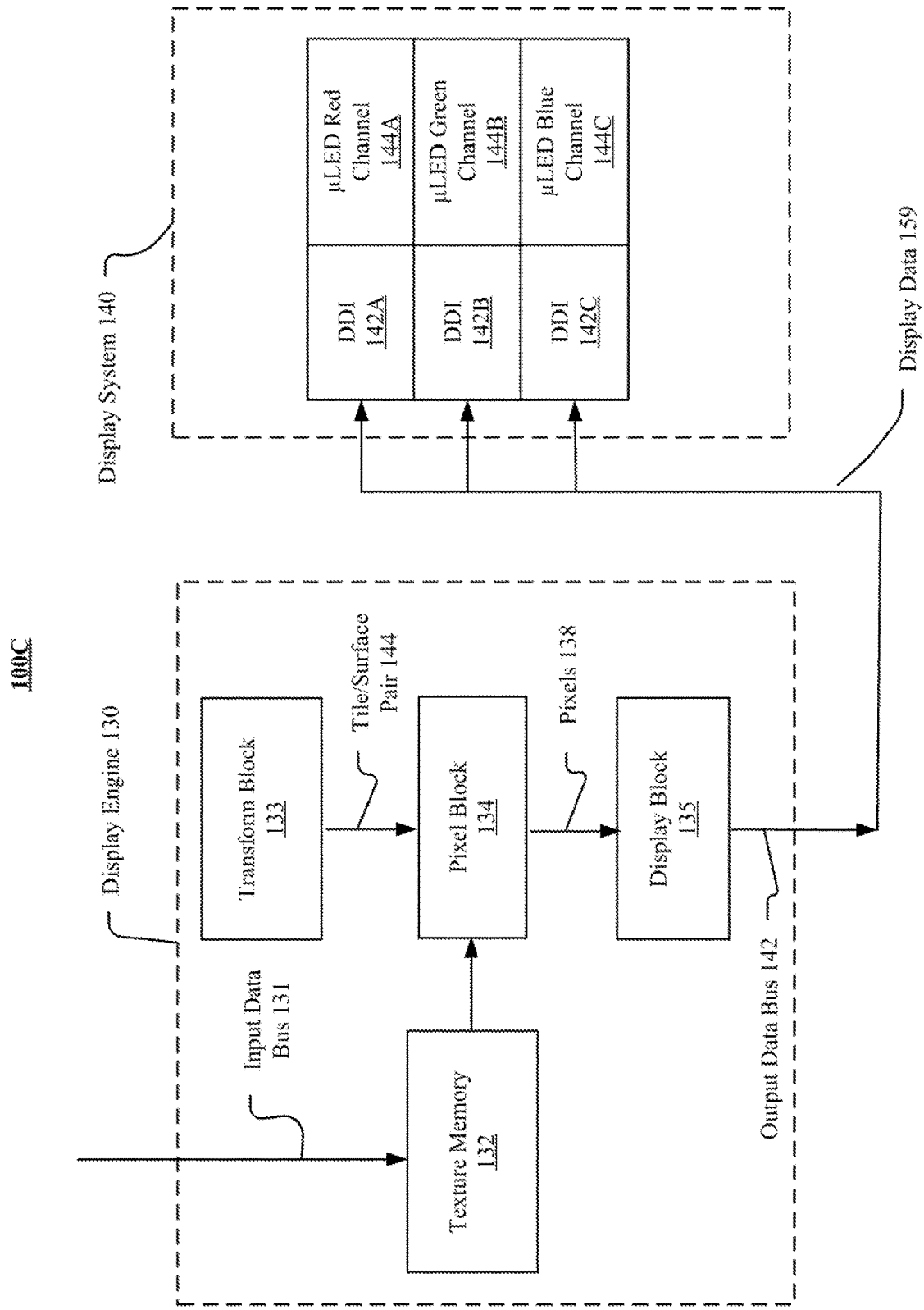
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
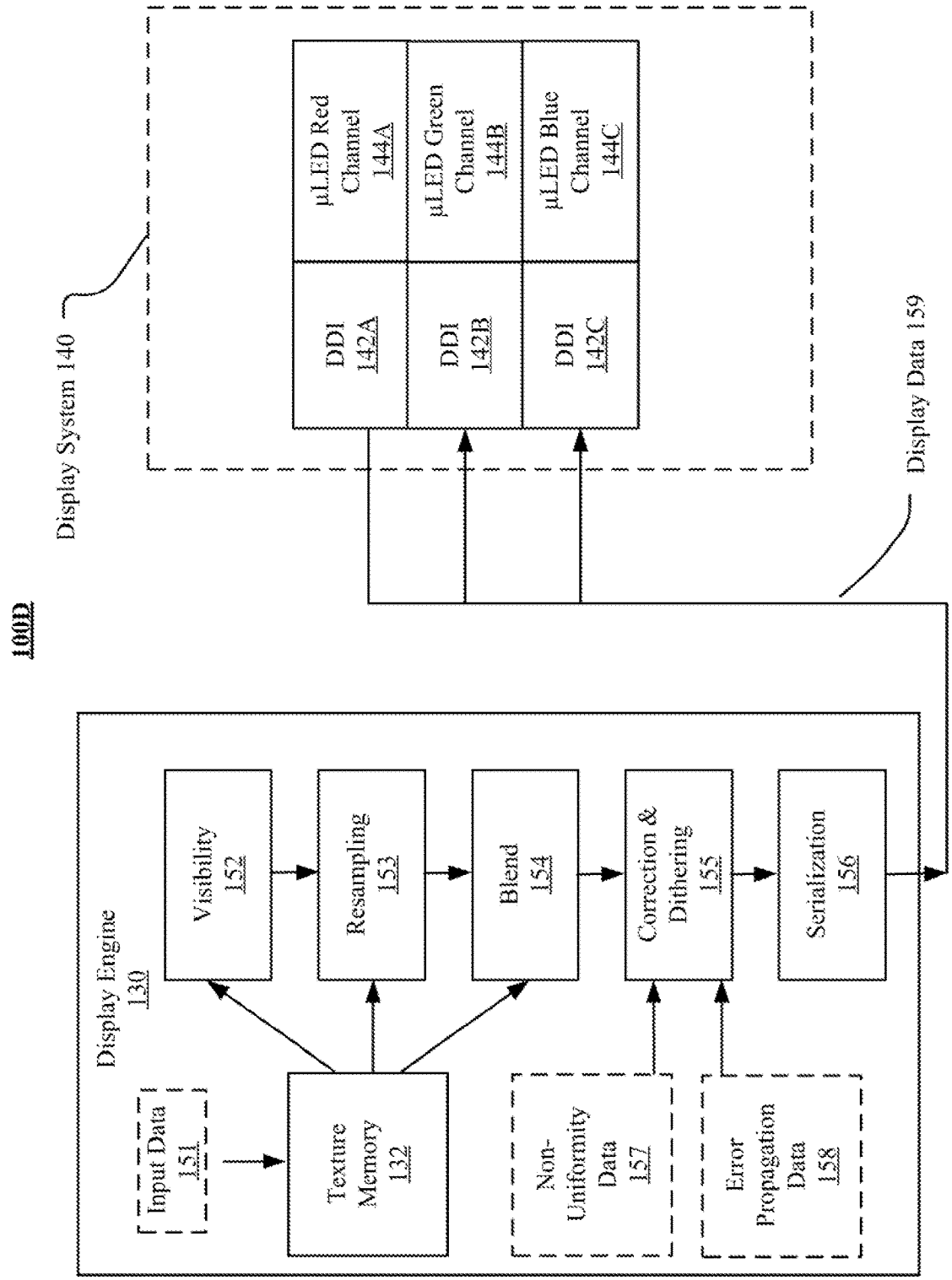
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The correction and dithering step 155 may be based on the non-uniformity data 157 and error propagation data 158. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
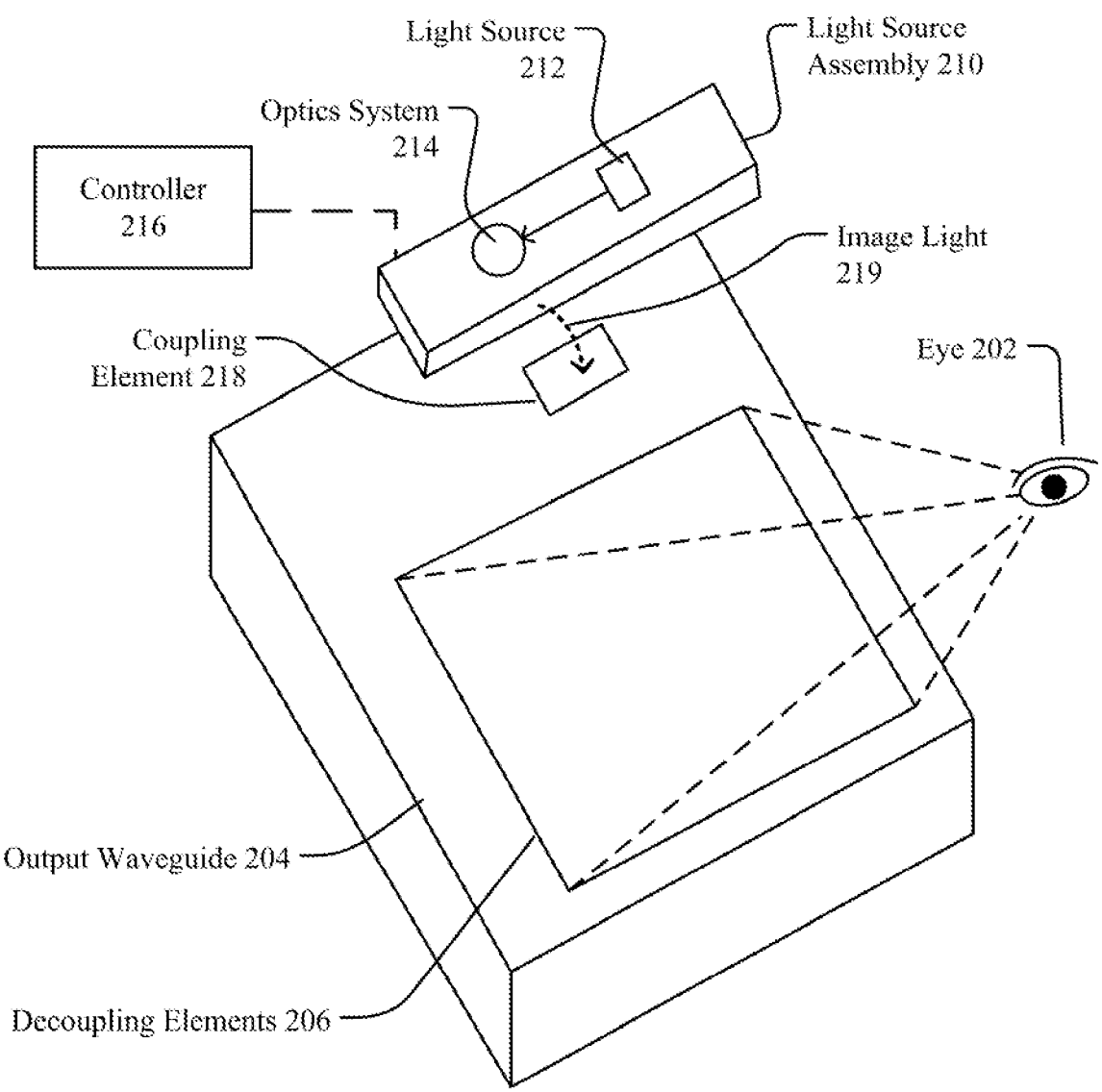
FIG. 2A illustrates an example scanning waveguide display.
Figure 3A:
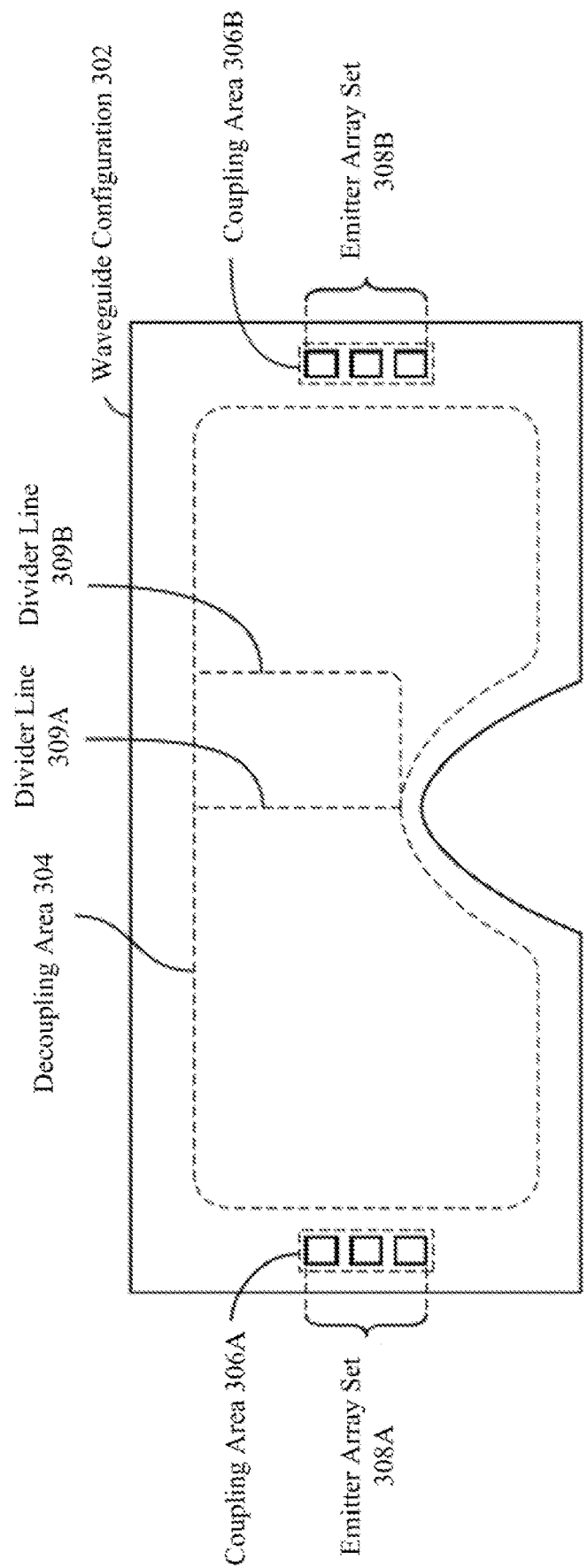
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
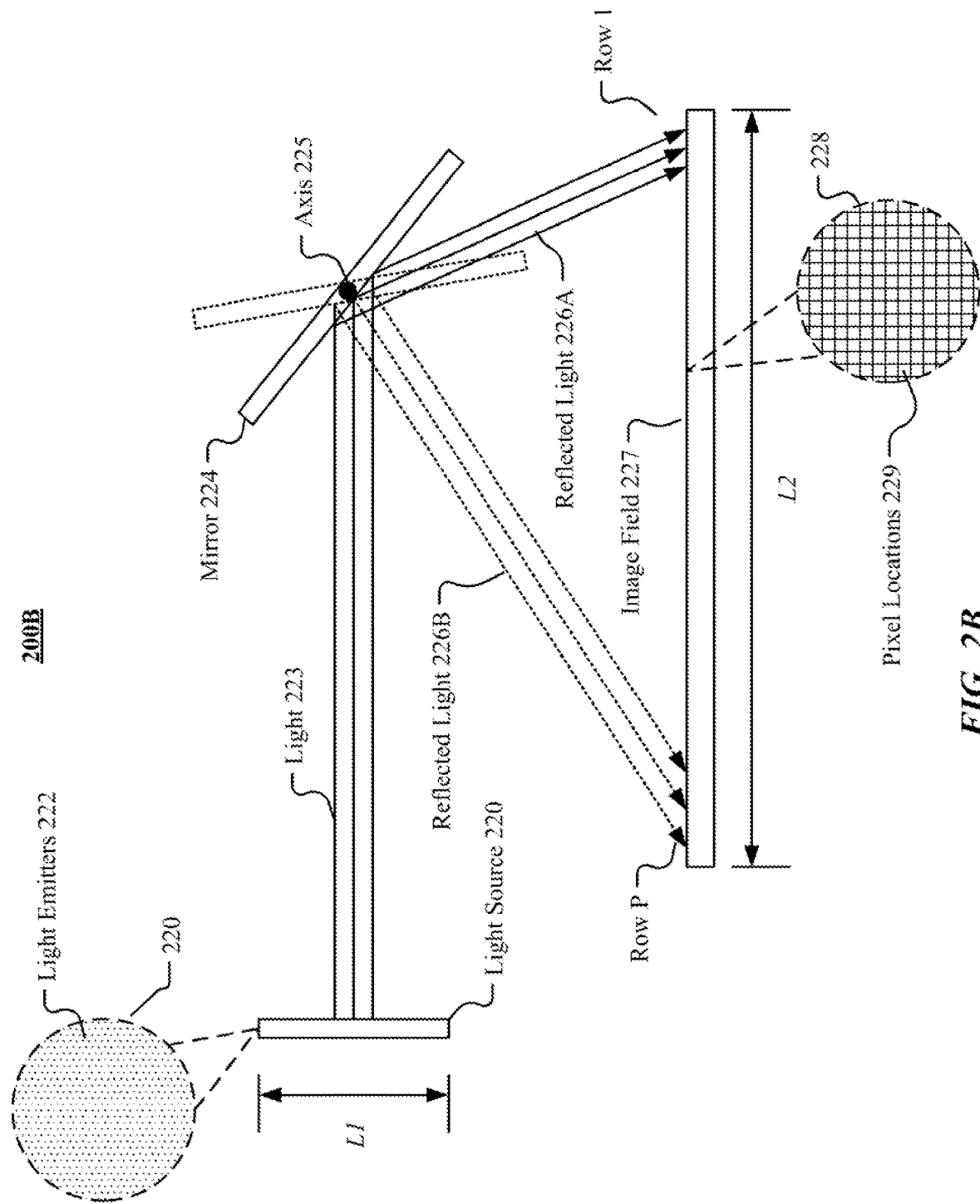
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
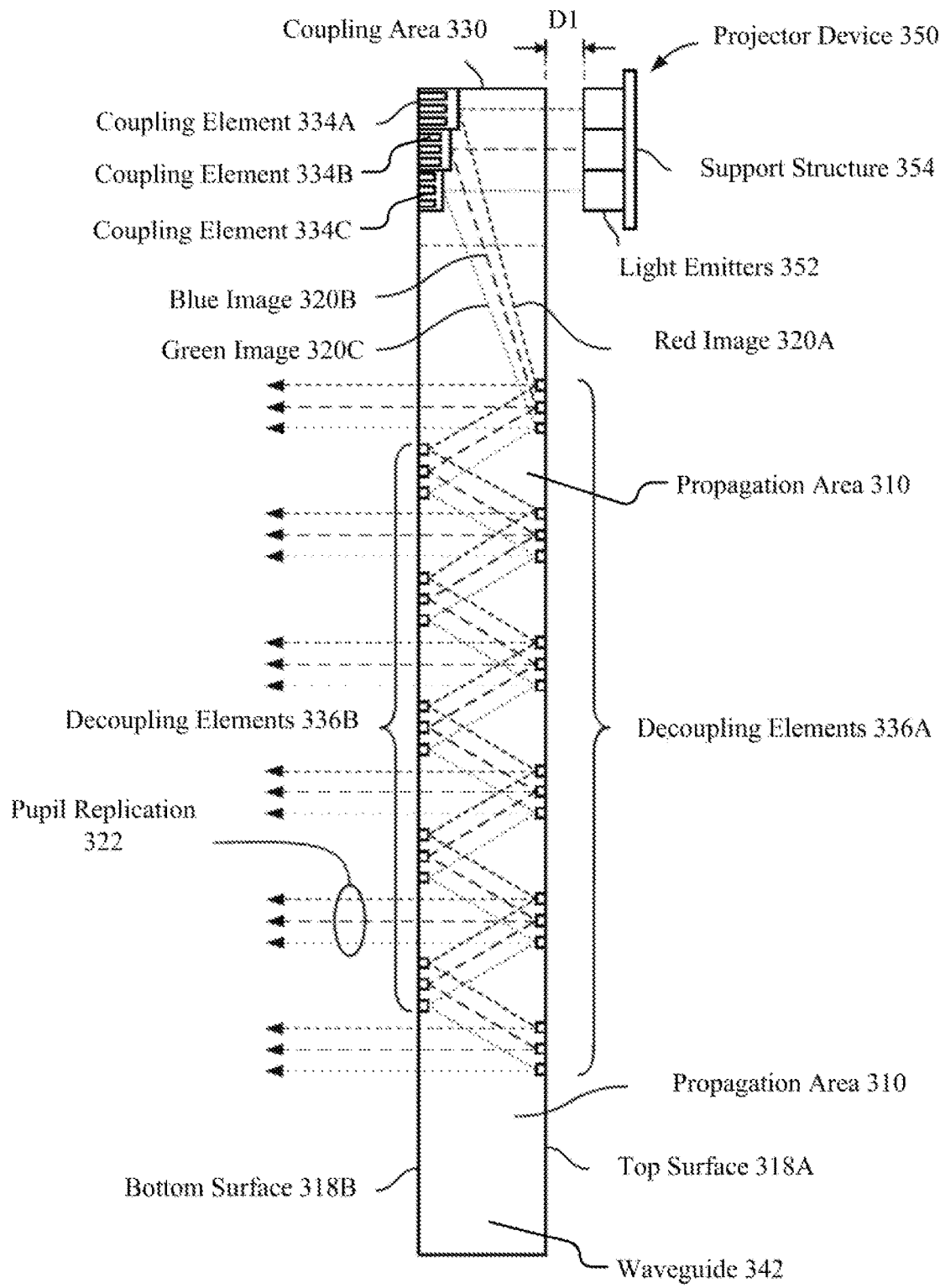
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

AR/VR display systems may use pupil-replication waveguides to transmit image light to a viewer's eyes. However, the waveguides may have spatially-varying non-uniformity for light transmission of each of RGB color channels. This non-uniformity may cause displayed images to have different colors when viewed from different eye positions, and therefore negatively affect user experience. Ideally, a static image viewed from a particular eye position may have its pixel values adjusted to compensate to the waveguide non-uniformity and eliminate the negative visual effect. However, for a sequence of dynamical images viewed from different eye positions, an eye tracking system may be needed to measure the eye position of the viewer dynamically to determine the appropriate compensation. The eye tracking system for determining the eye positions may have some problems, such as, latency and limitations in accuracy and precision. If the images are directly corrected based on eye positions provided by the eye tracking system, which could be inaccurate or delayed, the corrections made to the images could be in accurate or incorrect. When this happens, the viewer may observe flicker artifacts in the displayed sequence of images.

To solve this problem, particular embodiments of the system may correct the images to be displayed using correction maps that are generated based on: (1) the current eye position as determined using the eye tracking system; and (2) a temporal filter and previous correction maps used for correcting preceding frames. The system may generate correction maps for a number of pre-determined eye positions. Each correction map may include an array of scaling factors to scale the image pixel values. The system may store the pre-generated correction maps in a computer storage. For correcting a current frame of a sequence of images, the system may first determine the current eye position of the viewer using the eye tracking system and determine the correction maps for the current eye position based on interpolation (e.g., bicubic interpolation) of the correction maps retrieved from the computer storage. Then, the system may use a temporal filter to generate optimized correction maps based on the correction map generated by interpolation based on the current eye position and the correction maps used for correcting the preceding frames. After that, the system may up-sample the averaged correction maps into a higher spatial resolution that matches the image resolution or display resolution and apply the high-resolution maps to the current frame for display. As a result, the visual artifacts in the displayed sequence of images caused by the waveguide non-uniformity may be eliminated or reduced.

By compensating the waveguide non-uniformity, particular embodiments of the system may generate and display more realistic images with more accurate and precise colors. By using correction maps generated based on current eye positions, particular embodiments of the system may effectively eliminate or reduce the color change artifacts caused by the non-uniformity of the waveguide while the user's eye are moving with respect to the waveguide. The displayed content may appear to be smoother over time and more resilient to errors in the eye-tracking data. By using a temporal filter and taking into consideration correction maps of preceding frames, particular embodiments of the system may effectively eliminate or reduce the flicker artifacts caused by the non-uniformity compensation that only considers the spatial non-uniformity without considering the temporal domain. By generating and storing pre-determined correction maps with limited resolutions and at limited number of pre-determined eye positions, the system may improve the system efficiency and reduce the usage of computer resources.

In particular embodiments, the AR/VR display systems may use pupil-replication waveguides to transmit light to a viewer's eyes for display images or videos to the viewer. The images coupled into the waveguides may be replicated over the field of view. The pupil-replication waveguides may have spatially-varying properties for transmitting light of different colors and intensity nonuniformity for RGB color channels. As a result, a displayed image (or a portion of the displayed image) may appear to have different colors when being viewed from different eye positions (also referred to as pupil positions). For example, when an image is viewed from a particular eye position, an image region that should be white may appear to be magenta because the transmission of green channel is suppressed by the waveguides when viewed from that particular eye position. In particular embodiments, the system may compensate the waveguide's non-uniformity by adjusting the pixel values of the displayed images based on the current eye positions of the viewer. As an example and not by way of limitation, the system may measure the light transmission characteristics of the waveguides for particular eye positions and generate correction maps based on the measured transmission characteristics of the waveguides for those particular eye positions. Each correction map include an array of scaling factors for scaling image pixel values of a particular color channel. The system may generate a correction map for each color channel of the RGB color channels. When the viewer's eyes are at those particular eye positions, the system may apply the correction maps on the images to be displayed to adjust the pixel values of these images. An image with adjusted pixel values once displayed may have correct colors when viewed from those particular eye positions with the waveguide non-uniformity effect being eliminated or reduced.

Assuming that the desired full-color image in linear space is characterized by a first matrix P and the color waveguide pattern is characterized by a second matrix W, then the image I as seen by the viewer may be expressed as the following equation:

$$I = P \cdot W \tag{1}$$

The system may compensate the waveguide nonuniformity to reverse the color distortions in the images by modifying the pixel values of the image using correction maps F as determined by the following equation:

$$F = W^{-1} \tag{2}$$

Then, the system may generate a reasonable approximation to the desired image by applying the correction maps and deriving a corrected image P' in linear space using the following equation:

$$P' = P \cdot F \tag{3}$$

where the values in F may be in the range of [0, 1]. The image as seen by the viewer may be characterized by the following equation:

$$I = P' \cdot W = (P \cdot F) \cdot W \approx P \tag{4}$$

The approximation may be due to imperfect correction arising from factors such as latency and limited precision and accuracy in eye position measurement, misalignments, eye movements, etc. The correction range may be contained within the value range of F. In particular embodiments, the non-uniformity level may be within a nominal level of 5:1 and the ratio of the maximum F value to the minimum F value may be equal to or less than 5.

In particular embodiments, for a static image to be viewed from a particular eye position, the system may compensate the waveguide non-uniformity by applying the corresponding correction maps to that image to adjust its pixel values. And, the image with adjusted pixel values once displayed, when being viewed from that particular eye position, may have no or less visual artifacts caused by the waveguide non-uniformity. However, for displaying a sequence of dynamical images to a viewer and when the viewer's eye positions move within the field of view (e.g., from left to right), the sequence of dynamical images may appear to have different colors when viewed from different eye positions. As a result, the waveguide non-uniformity that varies with eye positions may impose both spatial and temporal requirements on the images to be displayed. Unlike the static image which can be effectively compensated in spatial-domain (e.g., using the correction maps for particular eye positions), a sequence of dynamical images to be viewed from different eye positions may need to be compensated in both spatial and temporal domains. In particular embodiments, for displaying a sequence of dynamical images viewed from different eye positions, the system may use an eye tracking system to measure the eye positions of the viewer dynamically and determine corresponding correction maps based on the dynamically measured eye positions.

However, the eye tracking system may have latency problem for measuring the eye positions for dynamical non-uniformity correction. The viewer's eyes may move by a relatively large distance during the time for generating and applying correction maps that are associated with a particular eye position. The viewer's eyes positions as determined by the eye tracking system may fall behind in time with respect to the actual eye positions of the viewer. The system may have a constant or variable time period between a first time moment when the eye tracking system measures the eye positions and a second time moment when the corrected frame is actually rendered and displayed. In particular embodiments, the latency of the eye tracking system may be up to 7 ms. Furthermore, the eye tracking system may have limited accuracy (e.g., a constant spatial offset from the ground truth) and limited precision (e.g., a sample-to-sample jitter, a time-varying difference between the ground truth and the eye tracking reading) for measuring the eye positions. In particular embodiments, the precision of the eye tracking system may be 0.086 mm (corresponding to 0.5 degree of the view angle) and the accuracy of the eye tracking system may be 0.125 mm (corresponding to 0.7 degree of the view angle). The accuracy and the precision of the eye tracking system may be independent to each other but may have joint impact on the quality of the displayed images. Spatial artifacts may be affected by the accuracy of the eye tracking system. Temporal artifacts may be affected by both accuracy and precision of the eye tracking system. As a result, if the images are directly corrected based on eye positions provided by the eye tracking system, the compensation made to the images may be inaccurate and non-precise. When this happens, the viewer may observe flicking or flashing artifacts in the displayed images. For example, a constant bias in the eye tracking system reading on the eye positions may result in inaccurate compensation maps. Inprecise eye position reading may lead to a higher level of noise in the eye position data and cause the correction maps to be non-smooth in temporal domain (e.g., the difference in correction maps of sequential frames being above a threshold). To solve these problems, particular embodiments of the system may correct the images to be displayed based on correction maps generated based on: (1) the current eye position (as determined using the eye tracking system); and (2) a temporal filter taking into consideration correction maps used for correcting previously frames, as will be described in later sections of this disclosure.

Figure 4A:
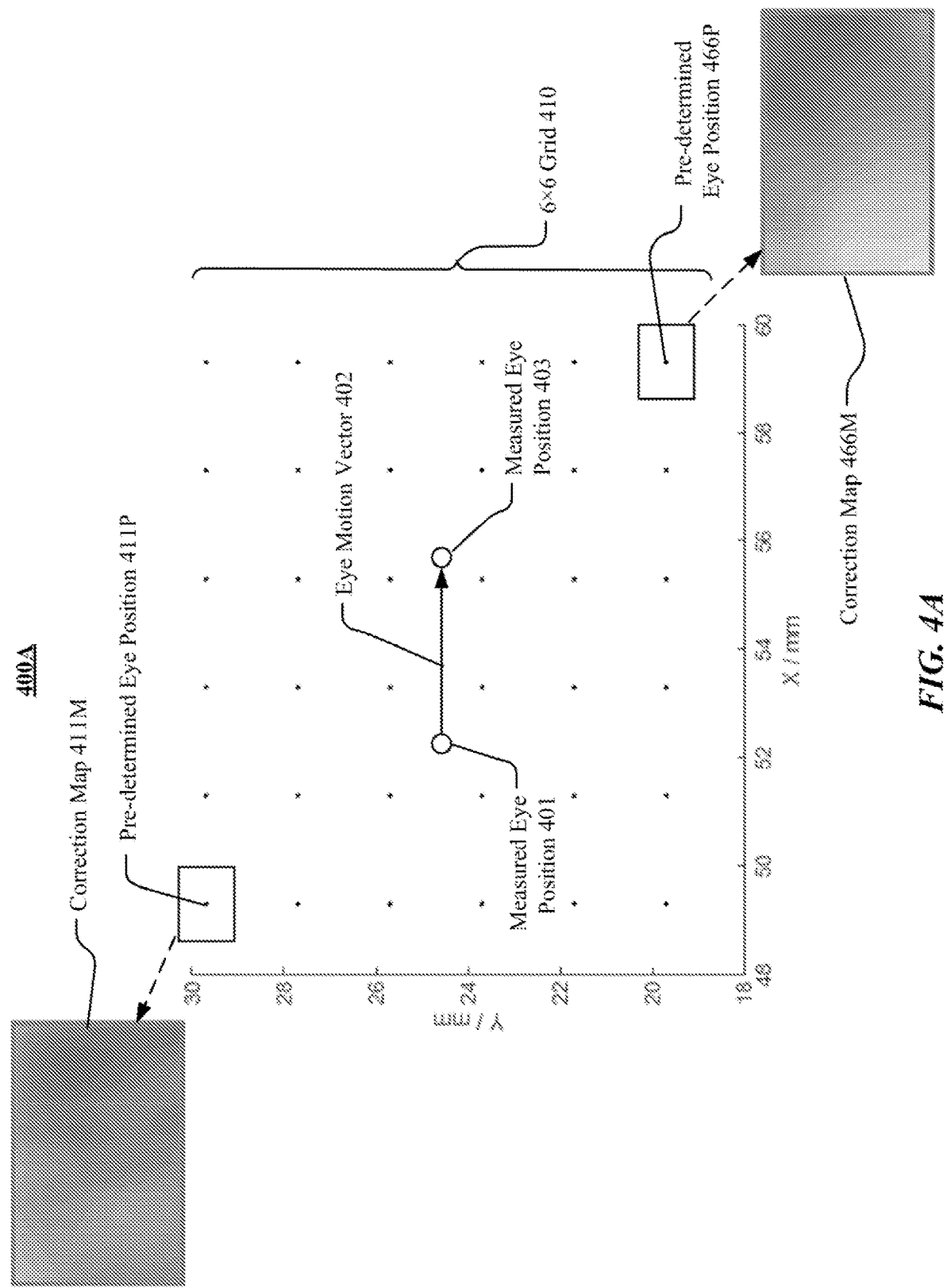
FIG. 4A illustrates an example process for measuring the waveguide non-uniformity and generating correction maps for pre-determined eye positions.

FIG. 4A illustrates an example process 400A for measuring the waveguide non-uniformity and generating correction maps for pre-determined eye positions. In particular embodiments, the system may pre-measure the light transmission characteristics of the waveguides from a number of pre-determined eye positions corresponding to a N×N mesh grid in the field of view of the waveguide (e.g., an eye-box area having a size of 10 mm×10 mm). Then, the system may generate correction maps for these pre-determined eye positions based on the measured light transmission characteristics. Each correction map may include an array of scaling factors for scaling the pixel values of a particular color channel of images to be displayed. As an example and not by way of limitation, the system may pre-measure the waveguide characteristics (e.g., light transmission characteristics for RGB color channels, color shifting ranges, color distortions, light intensities of different colors, etc.) at the positions corresponding to intersection points of a 6×6 mesh grid 410, as shown in FIG. 4. Each dot of the mesh grid 410 may correspond to an eye position (e.g., eye position 411P and 466P). Each eye position may correspond to a waveguide model characterizing the light transmission properties of the waveguide as viewed from that particular eye position. For each of these pre-determined eye positions (e.g., 411P and 466P), the system may generate corresponding correction maps (e.g., 411M and 466M) for adjusting pixel values of the images to be displayed. As another example, the system may pre-measure the waveguide characteristics at the positions corresponding to intersection points of a 9×7 mesh grid. In particular embodiments, the waveguide area may have a size of 10 mm×10 mm and may correspond to a field of view of 20 degrees×30 degrees. In particular embodiments, the color non-uniformity of the waveguide may be measured at every point with an interval distance of 2 mm of the waveguide region for generating the corresponding input correction maps. In particular embodiments, the system may generate correction maps for these pre-determined eye positions and store the generated maps in a database and a computer storage. In particular embodiments, the pre-generated correction maps may have relatively low spatial resolutions (e.g., 25 pixels×25 pixels) to minimize the burden on usage of the computer system resources (e.g., storage, memory access, processing power, etc.). The system may up-sample the low-resolution correction maps into a higher resolution that matches the image resolution or display resolution before applying correction maps to the image to be displayed, as will be described later in this disclosure.

In particular embodiments, for correcting a current frame of a sequence of images, the system may first determine the current eye position (X, Y) of the viewer using the eye tracking system. The current eye position (X, Y) may be determined at the beginning of the process for preparing the current frame. The system may compare the current eye position (X, Y) as determined by the eye tracking system to the pre-determined eye positions of the waveguide area (e.g., the eye-box area). When the current eye position (X, Y) falls on one of pre-determined eye positions (e.g., being within a threshold distance to a pre-determined eye position), the system may select the correction maps associated with that particular eye position. The system may access and retrieve the selected correction maps from the database and computer storage. The retrieved correction maps may be used for correcting the current frame to compensate the waveguide non-uniformity, after being processed by the later steps (e.g., a temporal filter and an up-sampling algorithm) of a graphic pipeline.

In particular embodiments, the current eye position (X, Y) of the viewer, as determined or measured using the eye tracking system, may not fall on any one of the pre-determined eye positions (e.g., beyond a threshold distance to any pre-determined eye positions) and fall in an area among these pre-determined positions. As an example and not by way of limitation, at a first moment, the eye position of the viewer may be located at the eye position 401 as measured or tracked by the eye tracking system and may start to move toward the eye position 403 along the eye motion vector 402. At a second moment, the eye position of the viewer may be located at the eye position 403 as measured or tracked by the eye tracking system. The system may need to display two frames of images to the viewer at the first moment and the second moment, respectively. The measured eye positions for these two frames may not fall on any pre-determined eye positions in the mesh grid 410. Instead, the measured eye positions 401 and 403 may fall in regions that are among the pre-determined eye positions. The system may generate the correction maps for the measured eye positions 401 and 403 based on interpolation on the pre-generated correction maps of the pre-determined positions.

In particular embodiments, the system may identify sixteen pre-determined eye positions that correspond a 4×4 array and are associated with an area (e.g., a smallest area corresponding to a 4×4 array of pre-determined positions) containing the current eye position (X, Y). Then, the system may access and retrieve sixteen groups of correction maps associated with the sixteen pre-determined eye positions from the database. After that, the system may apply bicubic interpolation on the sixteen groups of correction maps associated with the sixteen pre-determined eye positions to generate correction maps (for RGB color channels) for the current eye position. The system may use the bicubic interpolation to generate three correction maps for the three RGB color channels, respectively, with each correction map being generated based on bicubic interpolation of sixteen correction maps of the same color channel. In particular embodiments, alternatively, the system may identify the closest four pre-determined eye positions (e.g., a 2×2 array) that are located at the four corners of a mesh grid area that contains the current eye position (X, Y). Then, the system may apply bilinear interpolation on the four groups of correction maps associated with the four pre-determined eye positions to generate correction maps (for RGB color channels) for the current eye position. The system may use the bilinear interpolation to generate three correction maps for the RGB color channels, respectively, with each correction map being generated based on bilinear interpolation of four correction maps of the same color channel.

Figure 4B:
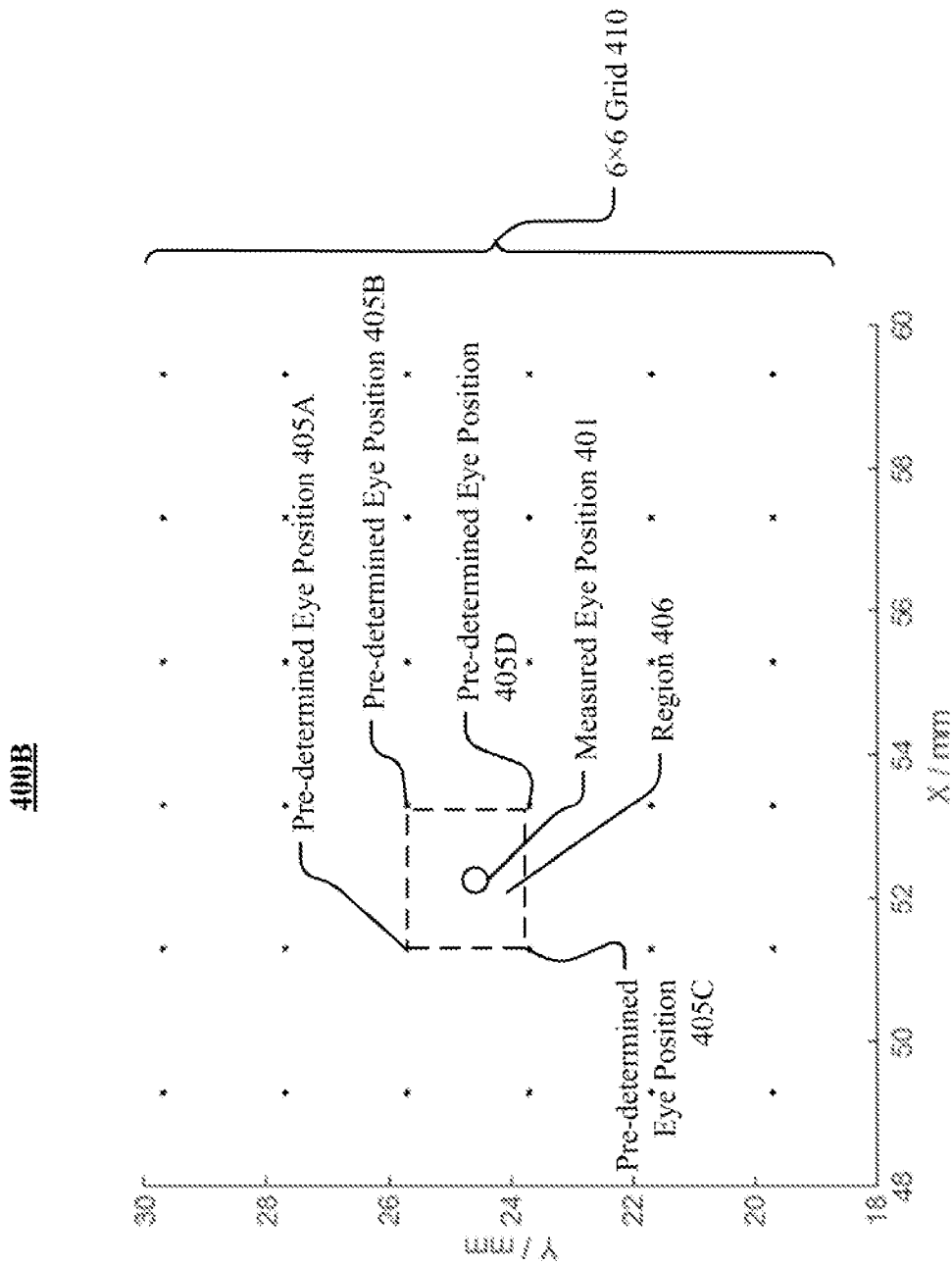
FIG. 4B illustrates an example process for generating correction maps for a current eye position based on bilinear interpolation of pre-generated correction maps.

FIG. 4B illustrates an example process 400B for generating correction maps for a current eye position 401 based on bilinear interpolation of pre-generated correction maps. In general, the values of the two-dimensional correction map may depend on the eye position of the viewer. The waveguide correction pattern may encompass the entire field of view but may be measured for a number of pre-determined eye positions. Reconstructing correction map for an intermediate eye position of the pre-determined positions may be a four-dimensional interpolation problem: two dimensions for the pupil position and another two dimensions for the spatial waveguide pattern. In particular embodiments, this four-dimensional problem may be reduced to a 2D interpolation given the waveguide region (e.g., an eye-box area) in which the pupil position falls within. In particular embodiments, the waveguide region (e.g., the eye-box area) may be sampled at a number of pre-determined points corresponding to a 6×6 mesh grid, as shown in FIGS. 4A-4B. The system may pre-generate correction maps for these points and store these pre-generated correction maps in a database and a computer storage. At run time, for displaying a current frame of image, the system may first determine or measure the current eye position (X, Y) using the eye tracking system. Then, the system may identify the closest four pre-determined eye positions (e.g., a 2×2 array) that are located at the four corners of a mesh grid area that contains the current eye position (X, Y). After that, the system may generate the correction maps for the current eye positions based on bilinear interpolation on the four groups of correction maps associated with the four pre-determined eye positions.

As an example and not by way of limitation, for the measured eye position 401 with coordinate of (X, Y) in the waveguide region (e.g., a 10 mm×10 mm eye-box area), the system may determine the normalized coordinates (x, y) of the measured eye position 401 with respect to the four pre-determined eye positions (e.g., 405A, 405B, 405C, and 405D) associated with the smallest mesh grid region 406 that contains the measured eye position 401. In particular embodiments, the N×N sample points may be indexed as using (i, j) where i is in the range of $1 \leq i \leq N$ and j is in the range of $1 \leq j \leq N$. The pupil location range in the X direction may be $[X_{min}, X_{max}]$ and the pupil location range in the Y direction may be $[Y_{min}, Y_{max}]$. In the example as shown in FIGS. 4A-4B, the eye position range in the X direction may be [49.3 mm, 59.3 mm] and the eye position range in the Y direction may be [19.7 mm, 29.7 mm]. The system may determine two intermediate parameters p and q using the following equations:

$$p = (N-1)(X - X_{min})/(X_{max} - X_{min}) \quad (5)$$

$$q = (N-1)(Y - Y_{min})/(Y_{max} - Y_{min}) \quad (6)$$

The eye position 405C, which is the corner of the mesh grid region 406 with the smallest coordinate values in both X and Y directions among the four corners of the mesh grid region 406, may have its index $(i_C, j_C)$ as determined using the following equation:

$$i_C = \text{floor}(p) \quad (7)$$

$$j_C = \text{floor}(q) \quad (8)$$

The normalized location (x, y) for the measured eye position 401 with respect to the four associated pre-determined eye positions (e.g., 405A, 405B, 405C, and 405D) may be determined using the following equation:

$$x = p - \text{floor}(p) \quad (9)$$

$$y = q - \text{floor}(q) \quad (10)$$

where, floor is the floor function. Then, the system may determine the correction maps F for the current eye position (X, Y) based on bilinear interpolation of the correction maps associated with the four pre-determined positions of 405A, 405B, 405C, and 405D. The waveguide correction map F at eye position (X, Y) may be determined using the following equation:

$$F = (1-x) \cdot (1-y) \cdot F_{i,j} + x \cdot (1-y) \cdot F_{i+1,j} + (1-x) \cdot y \cdot F_{i,j+1} + x \cdot y \cdot F_{i+1,j+1} \quad (11)$$

where $F_{i,j}$, $F_{i,j+1}$, $F_{i+1,j}$, and $F_{i+1,j+1}$ are the correction maps that are associated with the pre-determined eye positions of 405C, 405A, 405D, and 405B, respectively. Assuming $F_{00}=F_{i,j}$, $F_{01}=F_{i,j+1}$, $F_{10}=F_{i+1,j}$, and $F_{11}=F_{i+1,j+i}$, the interpolation may be written in a separable form as the following equation:

$$F(X,Y) = (1-y) \cdot a + b \cdot y \quad (12)$$

where (x, y) are the normalized coordinates of the eye position (X, Y) with respect to the four corners of the smallest grid region that contains the eye position (X, Y), a and b are the intermediate parameters as determined by the following equations:

$$a = (1-x) \cdot F_{00} + x \cdot F_{01} \quad (13)$$

$$b = (1-x) \cdot F_{10} + x \cdot F_{11} \quad (14)$$

Figure 4C:
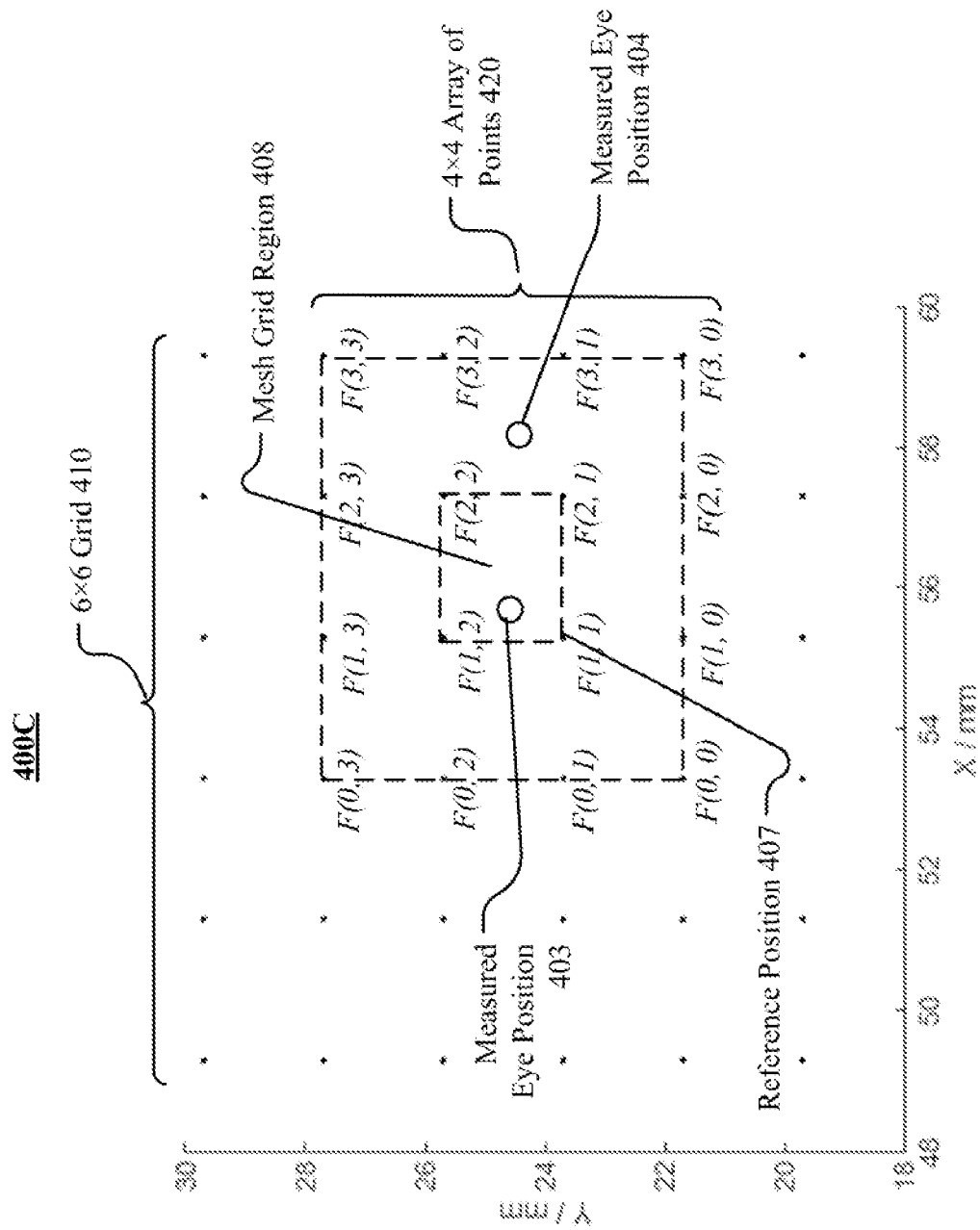
FIG. 4C illustrates an example process for generating correction maps for a current eye position based on bicubic interpolation of pre-generated correction maps.

FIG. 4C illustrates an example process 400C for generating correction maps for a current eye position 403 based on bicubic interpolation of pre-generated correction maps. In particular embodiments, the system may identify sixteen pre-determined eye positions (e.g., a 4×4 array) associated with a smallest area that corresponds to a 4×4 array of pre-determined eye positions and contains the current eye position (X, Y). Then, the system may apply bicubic interpolation on the sixteen groups of correction maps associated with the sixteen pre-determined eye positions to generate correction maps (for RGB color channels) for the current eye position (X, Y). The system may use the bicubic interpolation to generate three correction maps for the three RGB color channels, respectively, with each correction map being generated based on bicubic interpolation of sixteen correction maps of the same color channel. In particular embodiments, the system may identify the 4×4 points associated with a current eye position by: (1) firstly identifying the 2×2 points corresponding to the smallest mesh grid region (e.g., 408) containing the current eye position; (2) identifying a reference point (e.g., 407) corresponding to a corner of the grid region that has the smallest X and Y values among the four corners of the grid region; (3) identifying remaining 15 grid points based on the reference point using the relative positions relationships as shown by the points in the 4×4 array 420 in FIG. 4C. In particular embodiments, the bicubic interpolation may be used in the preferred embodiment for preventing flicker because bicubic interpolation has a continuous first derivative which is helpful for preventing flicker.

As an example and not by way of limitation, for the measured eye position 403, the system may identify a 4×4 array of points 420 in the grid 410 based on the eye position 403 as measured by the eye tracking system. The identified 4×4 points may correspond a smallest 4×4 point-region that contains the measured eye position 403. Then, the system may perform bicubic interpolation on the correction maps associated with the 4×4 array of points 420 to generate correction maps for the measured eye position 403. The bicubic interpolation may guarantee a continuous first derivative for interpolating the correction maps. Given the eye position (X, Y), the correction maps for the eye position (X, Y) may be determined using the bicubic interpolation of the following equations:

$$F(X,Y) = b + (y/2) \cdot (c - a + y \cdot (2a - 5b - 4c - d + y \cdot (3b - 3c + d - a))) \quad (15)$$

where the parameters a, b, c, and d are determined using the following equations:

$$a = F_{10} + (x/2) \cdot (F_{20} - F_{00} + x \cdot (2F_{00} - 5F_{10} - 4F_{20} - F_{30} + x \cdot (3F_{10} - 3F_{20} + F_{30} - F_{00}))) \quad (16)$$

$$b = F_{11} + (x/2) \cdot (F_{21} - F_{01} + x \cdot (2F_{01} - 5F_{11} - 4F_{21} - F_{31} + x \cdot (3F_{11} - 3F_{21} + F_{31} - F_{01}))) \quad (17)$$

$$c = F_{12} + (x/2) \cdot (F_{22} - F_{02} + x \cdot (2F_{02} - 5F_{12} - 4F_{22} - F_{32} + x \cdot (3F_{12} - 3F_{22} + F_{32} - F_{02}))) \quad (18)$$

$$d = F_{13} + (x/2) \cdot (F_{23} - F_{03} + x \cdot (2F_{03} - 5F_{13} - 4F_{23} - F_{33} + x \cdot (3F_{13} - 3F_{23} + F_{33} - F_{03}))) \quad (19)$$

where $F_{ij}$ are the correction maps at corresponding points of the selected 4×4 points; i and j are in the range of [0, 3].

In particular embodiments, to display a sequence of images, the system may use the eye tracking system to determine the viewer's eye position for each frame of the sequence of images and generate correction maps based on the corresponding eye position for each frame. Depending the frame rate of the images and the moving speed of the viewer's eyes, the viewer's eye position may have moved for a relatively large distance (e.g., larger than a threshold distance) during the time period between two sequential frames. As a result, the correction maps for a first frame and the correction maps for a second frame subsequent to the first frame may be quite different due to the relatively large distance between the measured eye positions for the first frame and the second frame. As a result, even if the generated correction maps work well to compensate the waveguide non-uniformity for the first and second frames separately, the viewer may encounter a flickering visual effect because of the relatively large difference in the correction maps.

To solve this problem, in particular embodiments, the system may use a temporal filter to take into consideration not only the correction maps for the current frame but also the correction maps that are used for correction preceding frames. In particular embodiments, the system may retrieve, from a computer storage, previous correction maps that are used for correcting preceding frames. Then, the system may use a temporal filter to generate, for each color channel, an optimized correction map based on the correction map generated for the current eye position (e.g., based on bilinear or bicubic interpolation on the pre-determined correction maps corresponding a N×N grid in the waveguide region) and the retrieved correction maps used for correcting the preceding frames. Then, the system may use the optimized correction map (after the up-sampling process as will described in later sections) to adjust the image pixel values of the images to be displayed to compensate the waveguide non-uniformity. In particular embodiments, the optimized correction map may be an average correction map generated based on an average or weighted average of the correction map generated for the current eye position (e.g., based on bilinear or bicubic interpolation on the pre-determined correction maps corresponding a N×N grid in the waveguide region) and one or more previous correction maps used for correcting the preceding frames. In particular embodiments, the optimized correction map may be generated using a probabilistic estimation method based on the correction map generated for the current eye position (e.g., based on bilinear or bicubic interpolation on the pre-determined correction maps corresponding a N×N grid in the waveguide region) and one or more previous correction maps used for correcting the preceding frames.

As an example and not by way of limitation, the system may determine an optimized correction map, for each color channel, based on the correction map generated for the current eye position based on interpolation of pre-generated correction maps, and a correction map used for a proceeding frame. As another example, the system may determine an optimized correction map, for each color channel, based on the correction map generated for the current eye position based on interpolation of pre-generated correction maps, and two correction maps associated with two proceeding frames. As an example and not by way of limitation, the system may determine an optimized correction map, for each color channel, based on the correction map generated for the current eye position based on interpolation of pre-generated correction maps, and three correction maps associated with three proceeding frames. As an example and not by way of limitation, the system may determine an optimized correction map, for each color channel, based on the correction map generated for the current eye position based on interpolation of pre-generated correction maps, and all the previous correction maps associated with all proceeding frames of the current frame.

In particular embodiments, the temporal filter may determine the optimized correction map using a direct average or weighted average on the correction map generated for the current eye position based on interpolation of pre-generated correction maps, and one or more previously correction maps used for correcting one or more preceding frames. For example, a scaling factor in the optimized correction map may be an average of corresponding scaling factors (e.g., scaling factors of the same index in respective maps) of the correction map generated for the current eye position, and one or more previously correction maps used for correcting preceding frames. As another example, a scaling factor in the optimized correction map may be a weighted average of corresponding scaling factors (e.g., scaling factors of the same index in respective maps) of the correction map generated for the current eye position and one or more previously correction maps used for correcting preceding frames. As yet another example, the scaling factors in the optimized correction map may be determined using a probabilistic estimation method based on corresponding scaling factors (e.g., scaling factors of the same index in respective maps) of the correction map generated for the current eye position and one or more previously correction maps used for correcting preceding frames. In particular embodiments, by using the optimized correction maps generated by the temporal filter, the system may reduce the difference between the correction maps for correcting sequential frames of the images. The sequential frames of images as corrected by respective optimized correction maps may have a smooth transition visual effect and may eliminate or reduce sharp changes in intensity caused by the difference in the correction maps. As a result, the displayed content may appear smoother over time and may be more resilient to errors in the eye-tracking data.

In particular embodiments, the pre-generated correction maps that are associated with the pre-determined eye positions and stored in the database may have a relatively low spatial resolution to minimize the usage of computer resources (e.g., computer storage space, memory space, CUP resources, battery life, etc.). As a result, the correction maps that are generated from the pre-generated correction maps based on bilinear or bicubic interpolation may also have a relatively low spatial resolution. Similarly, the previous correction maps associated with preceding frames that are stored in the computer storage may also have a relatively low spatial resolution to reduce the burden of the computer resource usage. As a result, the optimized correction map, which is generated by the temporal filter based on the correction map for the current eye position of the current frame and the correction maps associated with preceding frames, may also have a relatively low-resolution. In particular embodiments, the low-resolution maps may have a spatial resolution of 25 pixels×25 pixels corresponding to a 25×25 array of scaling factors. It is notable that the spatial resolution of 25 pixels×25 pixels is for example purpose and the correction map resolution is not limited thereto. For example, the correction map may have any suitable resolutions that allow the correction maps to be stored and processed with reasonable amount of computer resources.

In particular embodiments, since the optimized correction maps generated by the temporal filter may have a relatively low spatial resolution, the system may use a bilinear interpolation process to up-sample the optimized correction maps to a higher spatial resolution that matches the image resolution or display resolution (e.g., 1856 pixels×1472 pixels). Then, the system may apply the high-resolution correction maps, which are generated by the up-sampling process to the current frame (with each high-resolution correction map being applied to one color channel) before outputting the current frame for display. Applying these high-resolution correction maps may cause the pixel values of RGB color channels of the current frame to be adjusted by the corresponding scaling factors in these high-resolution correction maps. As a result, the visual artifacts caused by the waveguide non-uniformity may be eliminated or reduced and the system may have improved efficiency in usage of computer resources (e.g., less storage space being used, less processing power being used, longer battery life, etc.).

Figure 5:
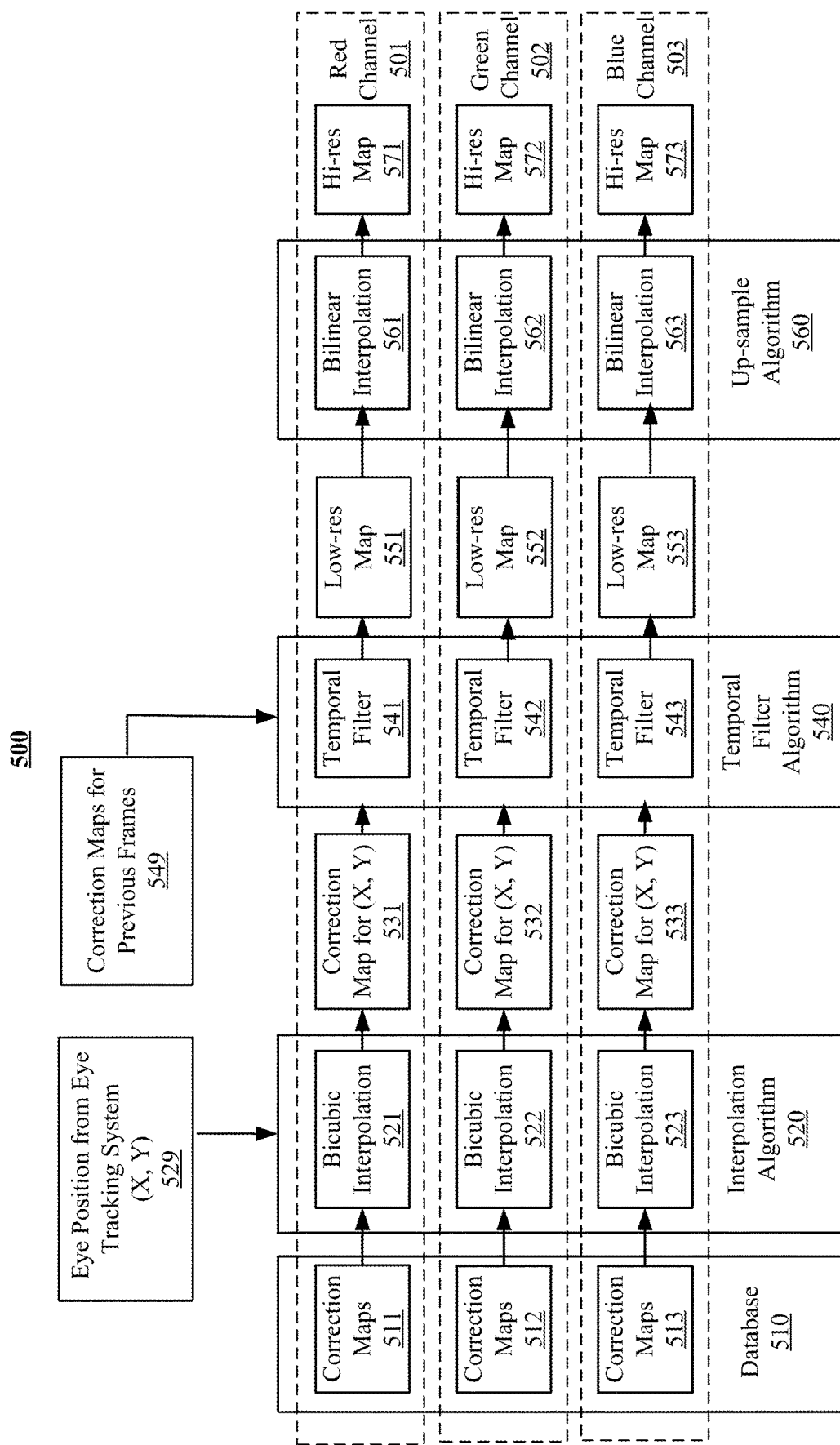
FIG. 5 illustrates an example framework for generating correction maps for a current eye position.

FIG. 5 illustrates an example framework 500 for generating correction maps for a current eye position. In particular embodiments, the system may use pupil replication waveguides to transmit light to the viewer's eyes for displaying images to the viewer. For displaying a current frame of image, the system may first use an eye tracking system to determine the (X, Y) coordinates of the current eye position 529 of the viewer. The current eye position 529 of the viewer may be with respect to the waveguide region corresponding to an eye-box area (e.g., 10 mm×10 mm). The light transmission properties of the waveguides may be pre-measured at a number of pre-determined positions in the waveguide region corresponding to the eye-box area. The pre-determined positions may correspond to a N×N mesh grid (e.g., 6×6 mesh grid) in the eye-box area. The system may pre-generate three correction maps for each of the pre-determined eye positions of the mesh grid, with each of the three correction maps being associated with a particular color channel. These correction maps may be generated based on the measured light transmission properties of the waveguides at corresponding eye positions. The system may store these pre-generated corrections maps (e.g., 511, 512, and 513) in a database 510 which may be stored in a computer storage. These pre-generated correction maps may have relatively low spatial resolution (e.g., 25 pixels×25 pixels) to reduce the burden on computer resources.

In particular embodiments, the system may receive the (X, Y) coordinates of the current eye position 529 from the eye tracking system and feed that eye position coordinates (X, Y) into the interpolation algorithm 520. The system may identify a 4×4 array of pre-determined eye positions in the N×N mesh grid (e.g., as shown in FIG. 4C) of the eye-box area. The 4×4 array of pre-determined eye positions may be associated with a mesh grid area that contains the current eye position (e.g., as shown in FIG. 4C). The system may retrieve, from the database 510, sixteen groups of pre-generated correction maps associated with the sixteen pre-determined eye positions. Each group of correction map may be associated with a corresponding pre-determined eye position. Each group of correction map may include three correction maps (e.g., 511, 512, and 513) each for a particular color channel of RGB color channels. The interpolation algorithm 520 may perform bicubic interpolation on the retrieved 16 groups of correction maps and generate one group of correction map which includes three correction maps each for a particular color channel of RGB color channels (e.g., 531 for red color channel, 532 for green color channel, 533 for blue color channel) for the current eye position (X, Y).

In particular embodiments, during the running process, the system may store previous correction maps (in a low resolution format) associated with preceding frames in a computer storage. For displaying the current frame of image, the system may access and retrieve the previous correction maps from the computer storage and use a temporal filter algorithm 540 to generate three optimized correction maps (e.g., 551, 552, and 553) for the current frame. Each optimized correction map may have relatively low spatial resolution (e.g., 25×25) and may be associated with a particular color channel of RGB (e.g., the low-resolution map 551 for red color channel 501, the low-resolution map 552 for green color channel 502, the low-resolution map 553 for blue color channel 503). In particular embodiments, each optimized correction map may be an average or weighted average of a corresponding correction map generated for the current eye position (X, Y) by the interpolation algorithm 520 and one or more previous correction maps (of the same color channel) that are associated with one or more preceding frames. In particular embodiments, the optimized correction maps may be generated using a probabilistic estimation method based on the corresponding correction map generated for the current eye position (X, Y) by the interpolation algorithm 520 and one or more previous correction maps (of the same color channel) that are associated with one or more preceding frames. Because the correction maps (e.g., 551, 552, and 553) generated by the temporal filter algorithm 540 are low-resolution maps, the system may use an up-sampling algorithm 560 to convert the low-resolution correction maps (e.g., 551, 552, and 553) into high-resolution correction maps (e.g., 571, 572, and 573). The up-sampling algorithm 560 may use bilinear interpolation (e.g., 561, 562, and 563) to generate the high-resolution correction maps based on the low-resolution correction maps. The high-resolution maps (e.g., 571, 572, and 573) may have a resolution that matches the resolution of the image to be displayed or the resolution of the display (e.g., e.g., 1856 pixels×1472 pixels). After that, the system may apply the three high-resolution correction maps (e.g., 571, 572, and 573) on the current frame of image to be displayed to adjust the pixel values of the current frame image. Each of the three high-resolution maps (e.g., 571, 572, and 573) may be applied to an associated color channel of the current frame of image. The system may output the current frame of image to the pupil replication waveguide of the display. As a result, the current frame of image may be displayed with the influence from the waveguide non-uniformity being eliminated or reduced.

In particular embodiments, for displaying a current frame, the system may use an eye tracking system to determine the current eye position of the viewer, generate correction maps for that eye position, and apply the correction maps to the current frame to adjust the image pixel values before outputting the image to display. However, generating correction maps and applying correction maps to the image, may take certain amount of time. If the viewer's eye moves rapidly, the eye position of the viewer may have moved for a relatively large distance (e.g., larger than a threshold distance) during that time period of determining the eye position, generating and applying the correction maps to the image. At the moment when the image is actually displayed, the eye position of the viewer may be at a second position which is different from the eye position (e.g., by a threshold distance) that is provided by the eye tracking system and is used for generating the correction maps. As a result, the displayed image, even adjusted by the correction maps, may still have artifacts caused by the waveguide non-uniformity.

To solve this problem, in particular embodiments, the system may predict where the eye position will be at the moment when the image is actually displayed (after being adjusted by the correction maps). In particular embodiments, the system may predict the eye position based on a predicted moving path or a moving trajectory of the eye position for a future period of time (e.g., 1-100 ms) from the current time moment. For example, the system may determine the moving velocity and moving direction (e.g., using the eye tracking data) and calculate the predicted moving path or moving trajectory of the viewer's eye position based on the moving velocity and moving direction. As another example, the system may identify one or more trends of the eye tracking data and predict the moving path or moving trajectory of the viewer's eye position based on the identified trends of the eyes tracking data. As another example, the system may predict the moving path or moving trajectory of the eye position based on the context of the displayed content (e.g., the content is designed to be viewed in a particular order following a particular path, the user is following a moving object).

In particular embodiments, the prediction may be made at the beginning moment of the process for preparing the current frame for display. Then, the system may calculate a predicted eye position for the time moment when the image will actually be displayed. The predicted eye position may be based on the current eye position as measured by the eye tracking system, the predicted moving trajectory, and the amount of time that is needed for generating the correction maps and applying the correction maps to the image. The predicted eye position may be much closer to the ground truth of the actual eye position at the moment when the image is actually displayed. Therefore, instead of using the eye tracking system reading directly for generating correction maps, the system may use the predicted eye position (corresponding to the time moment when the image will actually be displayed) to generate the correction maps. As a result, the correction maps generated based on the predicted eye position may correct the image and compensate the waveguide non-uniformity more effectively.

As example and not by way of limitation, for displaying a current frame, the system may use the eye tracking system to measure the current eye position at a first time moment corresponding to the beginning for preparing the current frame for display. The system may determine that, based on trends of the eye tracking data, the viewer's eye position is moving toward a particular direction along a straight line and with a first velocity. The system may predict a moving path of the eye position for a particular period of time (e.g., a time period corresponding to the time interval of two or more sequential frames). Then, the system may calculate the predicted eye position for the time moment when the image will be actually displayed. The system may calculate the predicted eye position based on the current eye position at the first time moment as measured by the eye tracking system, the predicted moving path of the eye position, and a time period corresponding to the amount of time for generating correction maps and applying the correction maps to the image. Then, the system may generate the correction maps (e.g., using bicubic interpolation on pre-generated correction maps) for the predicted eye position corresponding to the moment when the image will be actually displayed. After that, the system may use a temporal filter to generate a group of optimized correction maps based on the correction maps for the predicted eye positions and one or more previous correction maps associated with one or more preceding frames. Then, the system may up-sample the optimized correction maps to a higher resolution that matches the image resolution or display resolution and apply the high-resolution correction maps to the image before outputting the image for display. As a result, the influence of the waveguide non-uniformity on the visual effect may be effectively compensated.

In particular embodiments, the system may predict the moving path or moving trajectory of the viewer's eye position for a future time period covering one or more future frames. The system may predict, based on the predicted moving path or moving trajectory, the viewer's eye positions at any time moments during this time period. The system may predict the viewer's eye position for the current frame, for a half-frame moment, for the next frame, and other subsequent frames, etc. Then, the system may generate correction maps for the current frame and one or more subsequence future frames. In particular embodiments, the system may not only feed the previous correction maps used for correcting previous frames into the temporal filter but also feed the correction maps for one or more subsequent future frames into the temporal filter to generate the temporal optimized correction maps (the temporally smoothed correction maps). The temporal optimized correction maps may allow the displayed images to further reduce the artifacts caused by the waveguide non-uniformity and enable a smoother transition visual effect between frames.

In particular embodiments, the system may operate with a frame rate of 90 Hz. In particular embodiments, the system may further reduce the visual artifacts caused by the waveguide non-uniformity by increasing the frame rate. A higher frame rate may correspond to a shorter time period between two sequential frames. Given the same moving velocity of the eye position, a shorter time period between two sequential frames may correspondingly to a smaller moving distance for the eye position during that time period. Thus, the correction maps for sequential frames may have smaller amount of difference, and consequently lead to a smoother transition visual effect between the sequential frames.

In particular embodiments, the system may further reduce the artifacts caused by the waveguide non-uniformity by updating the correction maps multiple times per frame. As an example and not by way of limitation, the system may measure the current eye position at a first moment corresponding to the beginning of preparing a current frame for display. The system may calculate a predicted eye position for a future moment after the time period needed for generating and applying the correction maps. The system may generate and apply the correction maps to the current frame of image, as described in the other sections of this disclosure. Before actually outputting the corrected image, the system may measure the current eye position again and compare the measured current eye position and the predicted eye position used for generating the currently used correction maps. Even though the newly measured eye position may still have its own errors due to the measurement latency, the newly measured eye position may be closer to the ground truth of the eye position (e.g., within reasonable distance to the actual eye position of this moment) because of the absence of the steps of generating and applying the correction maps. When the measured current eye position and the predicted eye position are close to each other (e.g., within a threshold distance), the system may move forward to output the corrected current frame. When the measured current eye position and the predicted eye position are quite far from each other (e.g., beyond a threshold distance), the system may calculate a newly predicted eye position, and re-generate the correction map based on the newly predicted eye position, and re-apply these correction maps to the images. This system may repeat this process until the predicted eye position and the later measured eye position are within the threshold distance to each other. Then, the system may move forward to output the corrected current frame. Because the correction maps could be updated multiple time per frame, the correction maps may have a level of error due to the reduced error in the predicted eye position. As a result, the visual artifact caused by the waveguide non-uniformity may be further reduced.

In particular embodiments, the system may generate and apply correction maps to displayed images when the user's eye position is within a central eye-box area of the waveguide area and may not apply correction maps to displayed images when the user's eye position is beyond the central eye-box area. In particular embodiments, the system may determine a central eye-box area within the waveguide area which corresponds to the user's field of view. The central eye-box area may be a sub-area of the waveguide area and may be located at the center area of the waveguide area. In particular embodiments, the central eye-box area may have any suitable shapes or any suitable sizes smaller than the waveguide area. For example, the central eye-box area may be a rectangular sub-area of the waveguide area and may be aligned and co-centered with a rectangular waveguide area. As another example, the central eye-box area may be a circular sub-area at the center area of the waveguide area.

In particular embodiments, for the eye positions within the central eye-box area, the system may select a number of pre-determined eye positions (e.g., an array of eye positions with uniform interval distances) and generate three correction maps (for respective RGB color channels) for each of the pre-determined eye positions. The system may generate these correction maps based on the waveguide transmission characteristics measured at respective pre-determined eye positions. The system may store these pre-generated correction maps in a database. At run time, after determining a current user eye position, the system may first check if the current user eye position is within the central eye-box area. In response to a determination that the user's eye position is within the central eye-box area, the system may access the pre-generated correction maps and generate a correction map (for each color channel) for the current user eye position using the spatial-interpolating and temporal-averaging methods as described in this disclosure. Then, the system may apply the correction maps to the displaying images for the current user eye position.

However, in response to a determination that the user's eye position is beyond the central eye-box area, the system may not apply correction maps to the displaying images. As a result, when the user eye position is within the central eye-box area, the user may see the corrected images because of the presence of the correction maps. As the user's eye position moves progressively further from the central eye-box area, the user may see un-corrected images because of the lack of correction data. In particular embodiments, the system may generate a fixed correction map (for each color channel) for a central eye position (instead of a central eye-box area) and apply these fixed correction maps to the displayed images only when the user's eyes is at that central eye position (e.g., within a threshold distance to the center of the waveguide area). When the user's eye position moves away from the central eye position (e.g., beyond the threshold distance to the center of the waveguide area), the system may not apply correction maps to the displayed images. By only correcting images for the eye position within the central eye-box area or at the central eye position, the system may reduce the amount computer resources that are needed for generating and applying these correction maps, and at the same time, may provide better user experiences when the user's eye position is within the central eye-box area or at the central eye position.

Figure 6:
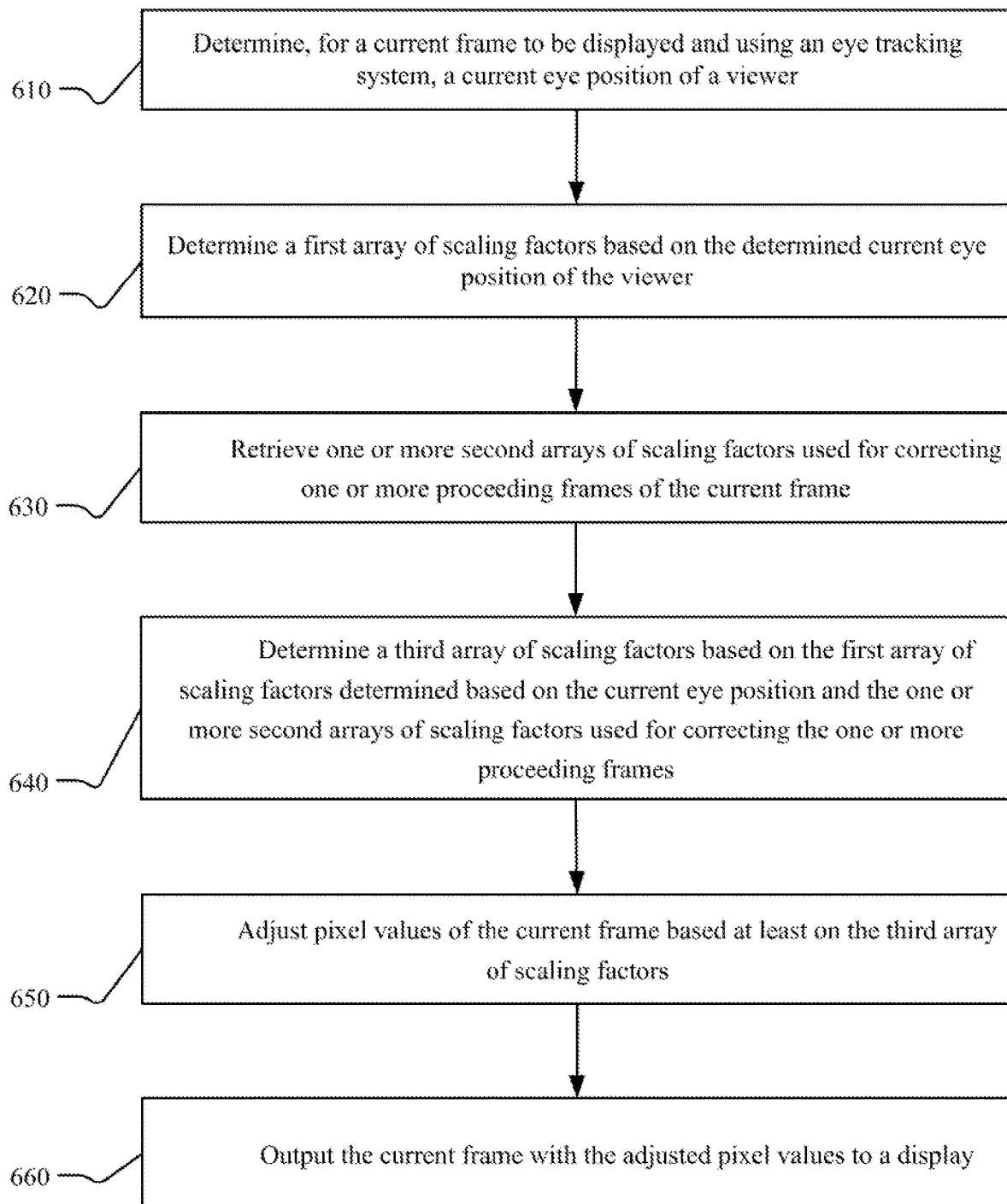
FIG. 6 illustrates an example method for compensating waveguide non-uniformity by adjusting image pixel values using correction maps.

FIG. 6 illustrates an example method 600 for compensating waveguide non-uniformity by adjusting image pixel values using correction maps. The method may begin at step 610, where a computing system may determine, for a current frame to be displayed and using an eye tracking system, a current eye position of a viewer. At step 620, the system may determine a first array of scaling factors based on the determined current eye position of the viewer. At step 630, the system may retrieve one or more second arrays of scaling factors used for correcting one or more proceeding frames of the current frame. At step 640, the system may determine a third array of scaling factors based on the first array of scaling factors determined based on the current eye position and the one or more second arrays of scaling factors used for correcting the one or more proceeding frames. At step 650, the system may adjust pixel values of the current frame based at least on the third array of scaling factors. At step 660, the system may output the current frame with the adjusted pixel values to a display. In particular embodiments, the current eye position may be with respect to a pupil replicating waveguide of the display for transmitting image light to eyes of the viewer.

In particular embodiments, the system may identify sixteen pre-determined eye positions associated with an area of the waveguide containing the current eye position. The system may access, from the computer storage, sixteen groups of pre-determined arrays of scaling factors associated with the sixteen pre-determined eye positions. The first array of scaling factors may be determined based on bicubic interpolation on the sixteen groups of pre-determined arrays of scaling factors. In particular embodiments, the first array of scaling factors, the sixteen groups of pre-determined arrays of scaling factors, and the third array of scaling factors may be associated with a particular color channel. The adjusted pixel values of the current frame may be associated with that particular color channel. In particular embodiments, the system may identify four pre-determined eye positions associated with an area of the waveguide containing the current eye position. The system may access, from the computer storage, four groups of pre-determined arrays of scaling factors associated with the four pre-determined eye positions. The first array of scaling factors may be determined based on bilinear interpolation on the four groups of pre-determined arrays of scaling factors. In particular embodiments, the first array of scaling factors, the four groups of pre-determined arrays of scaling factors, and the third array of scaling factors may be associated with a particular color channel. The adjusted pixel values of the current frame may be associated with that particular color channel.

In particular embodiments, the current eye position may be within a threshold distance to a pre-determined eye position associated with a pre-determined array of scaling factors. The first array of scaling factors may be determined by selecting the pre-determined array of scaling factors associated with that pre-determined eye position. In particular embodiments, each scaling factor in the third array of scaling factors may have an optimized value determined based on corresponding scaling factors of the first array of scaling factors and the one or more second arrays of scaling factors. In particular embodiments, each optimized scaling factor in the third array of scaling factors may be determined based on an average or a weighted average of corresponding scaling factors of the first array of scaling factors and the one or more second arrays of scaling factors. In particular embodiments, the optimized scaling factors in the third array of scaling factors may be determined using a probabilistic estimation method (e.g., based on corresponding scaling factors of the first array of scaling factors and the one or more second arrays of scaling factors). The third array of scaling factors may be determined by a temporal filter. In particular embodiments, the third array of scaling factors may have a number of first scaling factors corresponding to a first image resolution lower than a second image resolution of the current frame. In particular embodiments, the system may determine a number of second scaling factors based on bilinear interpolation on the first scaling factors. The system may determine a fourth array of scaling factors comprising the first scaling factors and the second scaling factors. The fourth array of scaling factors may correspond to a third image resolution equal to the second image resolution of the current frame. Adjusting pixel values of the current frame based on the third array of scaling factors may include applying the fourth array of scaling factors to the current frame.

In particular embodiments, the system may determine a predicted eye-position trajectory for the viewer corresponding to a pre-determined time window. The predicted eye-position trajectory may be determined based on eye tracking data. In particular embodiments, the system may determine a predicted eye position of the viewer for the current frame based on the current eye position and the predicted eye-position trajectory. The predicted eye position may correspond to a future time when the current frame is displayed factoring in an amount of time needed for determining the third array of scaling factors and applying the third array of scaling factors to the current frame. In particular embodiments, the first array of scaling factors may be determined based on the predicted eye position of the viewer. In particular embodiments, the system may determine a predicted eye position of the viewer for each of one or more sequential frames of the current frame. The system may determine a fifth array of scaling factors for each of the one or more sequential frames of the current frame. The third array of scaling factors may be determined based on the fifth arrays of scaling factors for the one or more sequential frames of the current frame.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for compensating waveguide non-uniformity by applying correction maps on images to be displayed including the particular steps of the method of FIG. 6, this disclosure contemplates any suitable method for compensating waveguide non-uniformity by applying correction maps on images to be displayed including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
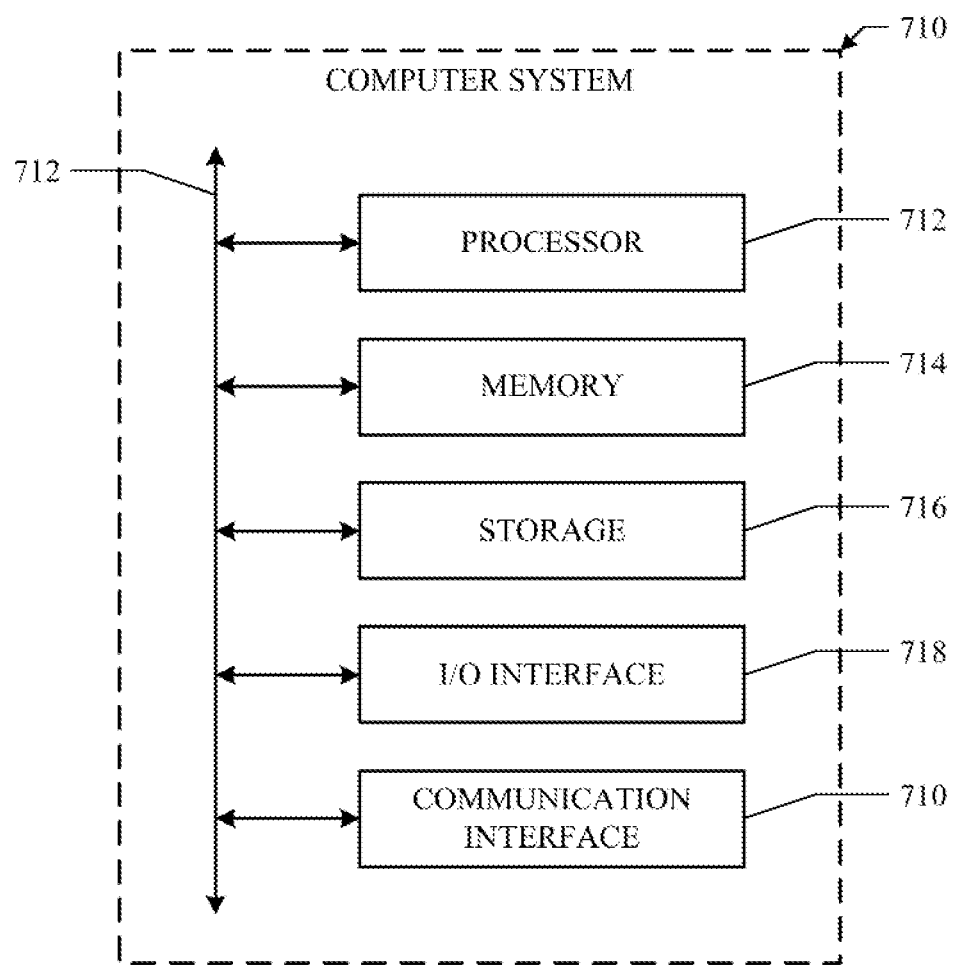
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a predicted eye position of a viewer, the predicted eye position corresponding to a future time moment for displaying a frame;
   generating a first correction map for the frame based on the predicted eye position of the viewer;
   retrieving one or more second correction maps used for correcting one or more proceeding frames;
   generating a third correction map based on the first correction map generated based on the predicted eye position of the viewer and the one or more second correction maps used for correcting the one or more proceeding frames;
   adjusting pixel values of the frame based at least on the third correction map; and
   outputting the frame with the adjusted pixel values to a display.

2. The method of claim 1, further comprising:
   determining a current eye position, an eye moving velocity, an eye moving direction of the viewer using an eye tracking system; and
   determining a predicted eye moving trajectory of the viewer based on the current eye position, the eye moving velocity, and the eye moving direction of the viewer, wherein the predicted eye position of the viewer is determined based on the predicted eye moving trajectory and the future time moment for displaying the frame.

3. The method of claim 1, further comprising:
   determining a predicted eye moving trajectory of the viewer based on one or more attributes associated with one or more display contents of the one or more proceeding frames, wherein the predicted eye position is determined based on the predicted eye moving trajectory and the future time moment for displaying the frame.

4. The method of claim 1, further comprising:
   determining a predicted eye moving trajectory of the viewer based on one or more attributes associated with one or more display contents of one or more subsequent frames, wherein the predicted eye position is determined based on the predicted eye moving trajectory and the future time moment for displaying the frame.

5. The method of claim 1, wherein the first correction map and the one or more second correction maps are fed into a temporal filter, and wherein the third correction map is determined using the temporal filter.

6. The method of claim 5, wherein the temporal filter covers a time window covering the one or more proceeding frames and one or more subsequent frames.

7. The method of claim 1, wherein the third correction map comprises a plurality of scaling factors corresponding to a spatial resolution lower than an image resolution of the frame, and wherein the third correction map is up-sampled to a higher spatial resolution that matches the image resolution of the frame to be displayed.

8. The method of claim 7, wherein the third correction map is up-sampled using a bilinear interpolation process.

9. The method of claim 1, wherein the predicted eye position is with respect to a waveguide of the display for transmitting image light to eyes of the viewer.

10. The method of claim 1, further comprising:
    increasing a frame rate for displaying a plurality of frames, wherein the increased frame rate corresponds to a shorter time period between two sequential frames, and wherein the shorter time period corresponds to a smaller eye moving distance between the two sequential frames.

11. The method of claim 1, further comprising:
    determining, using an eye tracking system, an updated eye position of the viewer after the third correction map is generated and the pixel values of the frame are adjusted; and
    comparing the updated eye position of the viewer to the predicted eye position of the viewer, wherein the frame is outputted to the display in response to a determination that the updated eye position and the predicted eye position of the viewer are within a threshold distance.

12. The method of claim 1, further comprising:
    determining, using an eye tracking system, an updated eye position of the viewer after the third correction map is generated and the pixel values of the frame are adjusted;
    updating the predicted eye position of the viewer based on a new prediction operation in response to a determination that that the updated eye position and the predicted eye position of the viewer are farer than a threshold distance; and
    re-generating the third correction map based on the updated predicted eye position of the viewer, wherein the pixel values of the frame are adjusted based on the re-generated third correction map.

13. The method of claim 12, wherein the third correction map is re-generated multiple times for the frame to be displayed.

14. The method of claim 1, further comprising:
    determining one or more subsequent predicted eye positions of the viewer for one or more subsequent frames to be displayed; and
    generating one or more fourth correction maps for the one or more subsequent frames, wherein the third correction map is determined further based on the one or more fourth correction maps.

15. The method of claim 1, wherein the pixel values of the frame are adjusted based on the third correction map in response to a determination that the predicted eye position of the viewer is within an eye-box area.

16. The method of claim 1, wherein the pixel values of the frame are adjusted based on the third correction map in response to a determination that the predicted eye position of the viewer is within a threshold distance to a central eye position.

17. The method of claim 1, further comprising:
    identifying sixteen pre-determined eye positions associated with an area of a waveguide containing the predicted eye position; and
    accessing, from a computer storage, sixteen groups of pre-determined correction maps associated with the sixteen pre-determined eye positions, wherein the first correction map is determined based on a bicubic interpolation on the sixteen groups of pre-determined correction maps, and wherein the first correction map, the one or more second correction maps, and the third correction map are associated with a color channel of RGB color channels.

18. The method of claim 1, further comprising:
identifying four pre-determined eye positions associated with an area of a waveguide, the area containing the predicted eye position; and
accessing, from a computer storage, four groups of pre-determined correction maps associated with the four pre-determined eye positions, wherein the first correction map is determined based on a bilinear interpolation on the four groups of pre-determined correction maps, and wherein the first correction map, the one or more second correction maps, and the third correction map are associated with a color channel of RGB color channels.

19. One or more computer-readable non-transitory storage media embodying software that is operable when executed to:
determine a predicted eye position of a viewer, the predicted eye position corresponding to a future time moment for displaying a frame;
generate a first correction map for the frame based on the predicted eye position of the viewer;
retrieve one or more second correction maps used for correcting one or more proceeding frames;
generate a third correction map based on the first correction map generated based on the predicted eye position of the viewer and the one or more second correction maps used for correcting the one or more proceeding frames;
adjust pixel values of the frame based at least on the third correction map; and
output the frame with the adjusted pixel values to a display.

20. A system comprising:
one or more processors; and a memory coupled to the processors comprising instructions executable by the processors, the processors being operable when executing the instructions to:
determine a predicted eye position of a viewer, the predicted eye position corresponding to a future time moment for displaying a frame;
generate a first correction map for the frame based on the predicted eye position of the viewer;
retrieve one or more second correction maps used for correcting one or more proceeding frames;
generate a third correction map based on the first correction map generated based on the predicted eye position of the viewer and the one or more second correction maps used for correcting the one or more proceeding frames;
adjust pixel values of the frame based at least on the third correction map; and
output the frame with the adjusted pixel values to a display.

* * * * *